US012661803B2

(12) United States Patent
Bortoff et al.

(10) Patent No.: US 12,661,803 B2
(45) Date of Patent: Jun. 23, 2026

(54) SYSTEM AND METHOD FOR CONTROLLING OPERATION OF ROBOTIC MANIPULATOR WITH SOFT ROBOTIC TOUCH

(71) Applicant: Mitsubishi Electric Research Laboratories, Inc., Cambridge, MA (US)

(72) Inventors: Scott Bortoff, Brookline, MA (US); Mruganka Kashyap, Boston, MA (US); Ankit Bhatia, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 140 days.

(21) Appl. No.: 18/508,914

(22) Filed: Nov. 14, 2023

(65) Prior Publication Data

US 2025/0010489 A1 Jan. 9, 2025

Related U.S. Application Data

(60) Provisional application No. 63/524,753, filed on Jul. 3, 2023.

(51) Int. Cl.
B25J 9/16 (2006.01)
B25J 13/08 (2006.01)

(52) U.S. Cl.
CPC ........... B25J 13/084 (2013.01); B25J 13/082 (2013.01)

(58) Field of Classification Search
CPC ...... B25J 13/084; B25J 13/082; B25J 9/1697;

B25J 9/1612; G05B 2219/39342; G05B 2219/39343; G05B 2219/39475; G05B 2219/40575; G05B 2219/40625
USPC ......................................................... 700/258
See application file for complete search history.

(56) References Cited

U.S. PATENT DOCUMENTS

| | | | |
|---|---|---|---|
| 10,576,626 B2 | 3/2020 | Rose et al. | |
| 10,842,578 B2 | 11/2020 | Kawasaki | |
| 11,433,555 B2 | 9/2022 | Smith et al. | |
| 11,878,415 B2 * | 1/2024 | Rodriguez Garcia | ...................... B25J 13/084 |
| 2013/0325181 A1 * | 12/2013 | Moore | ................... B25J 13/086 901/31 |

(Continued)

OTHER PUBLICATIONS

XP093210767_Modelica-Based_Control_of_a_Delta_Robot.pdf (Year: 2022).*

*Primary Examiner* — B M M Hannan
(74) *Attorney, Agent, or Firm* — Gene Vinokur

(57) ABSTRACT

Feedback control for controlling a robotic manipulator includes receiving measurement signals from one or more tactile sensors and filtering the measurement signals to align them with the directions of motion of the end effector to produce an impedance-shaping signal. The feedback control determines one or more control signals to the actuators to track a reference state of the end effector based on measurements of the state of the end effector and combines the control signal with the impedance shaping signal to produce control commands. Also, the feedback control may include submitting the determined control commands to the actuators causing a change in the state of the end effector, where the state of the end effector includes one or a combination of an end effector position, an end effector velocity, and an end effector force.

20 Claims, 13 Drawing Sheets

(56)     References Cited

U.S. PATENT DOCUMENTS

| 2016/0243704 | A1* | 8/2016 | Vakanski | B25J 9/1664 |
| 2018/0264660 | A1* | 9/2018 | Bergeron | B25J 9/046 |
| 2022/0126453 | A1* | 4/2022 | Corcodel | B25J 9/1694 |
| 2023/0025647 | A1* | 1/2023 | Kanemoto | B25J 9/1638 |
| 2023/0071488 | A1* | 3/2023 | Kanemoto | B25J 9/1697 |

* cited by examiner

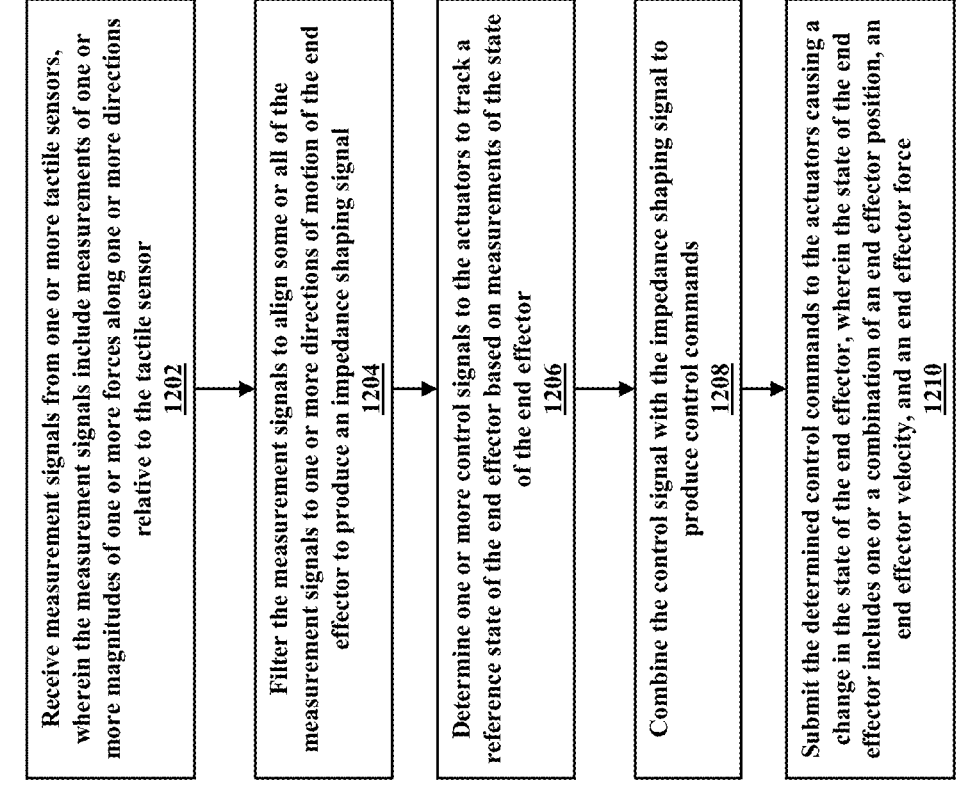

1200

Receive measurement signals from one or more tactile sensors, wherein the measurement signals include measurements of one or more magnitudes of one or more forces along one or more directions relative to the tactile sensor
1202

Filter the measurement signals to align some or all of the measurement signals to one or more directions of motion of the end effector to produce an impedance shaping signal
1204

Determine one or more control signals to the actuators to track a reference state of the end effector based on measurements of the state of the end effector
1206

Combine the control signal with the impedance shaping signal to produce control commands
1208

Submit the determined control commands to the actuators causing a change in the state of the end effector, wherein the state of the end effector includes one or a combination of an end effector position, an end effector velocity, and an end effector force
1210

Figure 12.

SYSTEM AND METHOD FOR CONTROLLING OPERATION OF ROBOTIC MANIPULATOR WITH SOFT ROBOTIC TOUCH

TECHNICAL FIELD

The present disclosure relates generally to robotic manipulation, and more particularly to controlling an operation of a robotic manipulator with a soft robotic touch suitable for applications that include object contact and collision, such as assembly of objects.

BACKGROUND

Robotic manipulators are commonly used in applications that involve contacts or collisions among objects, such as in assembly of objects. In these applications, when a robotic manipulator comes in contact, or loses contact, with one or more objects to be manipulated, or the relative motion of a robotic manipulator causes contact or loss of contact among objects in its environment, one or more collision events occur. A collision event is the point in time when contact is made or broken among a robotic manipulator and one or more objects to be manipulated. For example, when a robotic manipulator grasps an object at rest, a collision event occurs between the robotic manipulator and the object. As another example, a robotic manipulator may be in contact with one object, and that object may collide with another object due to their relative motion.

When a collision event occurs among a robot manipulator and one or more objects in its environment, an exchange of energy or momentum occurs among the robotic manipulator and the object(s). A collision event will therefore result in a change of energy or momentum of the robotic manipulator and object(s) during or after a collision event. In many robotic manipulator applications, it is beneficial to minimize the magnitude of a transfer of energy or momentum, in order to avoid damage to the object(s) or robotic manipulator, for example, or in order to successfully achieve a particular robotic manipulation task, for example.

Commonly practiced strategies to reduce the magnitude of a transfer of energy or momentum among a robotic manipulator and one or more object in its environment include reducing the magnitude of a robotic manipulator approach velocity, introducing mechanical compliance to the robotic manipulator, or reducing the mass of the robotic manipulator. However, each of these strategies may be impractical or may compromise some performance metrics of the robotic manipulator. Reducing the magnitude of approach velocity of a robotic manipulator may reduce productivity, simply because it moves more slowly. Introducing compliance into the robotic manipulator can increase the trajectory tracking error, reducing the accuracy of the robotic manipulator. Reducing the mass of the robotic manipulator may require modification or redesign of the robotic manipulator, and it may not be practical or possible to achieve without compromising other performance metrics of the robotic manipulator.

Another common strategy to reduce the magnitude of a transfer of energy or momentum among a robotic manipulator and one or more objects in its environment during or after a collision event is to modify the robotic manipulator motion controller in a manner that reduces the mechanical impedance of the robotic manipulator system. Herein, the term robotic manipulator system refers to the union of a robotic manipulator, its actuators and its robotic manipulator motion controller. Mechanical impedance is one of several metrics that are commonly used to characterize the performance of a robotic manipulator system, and is commonly defined as the ratio of force to velocity, where the force is between a robotic manipulator and an object, and the velocity is the result of that force.

For linear systems, impedance is commonly represented in the frequency domain in a manner analogous to electrical impedance, which is the ratio of voltage to current. In this case, mechanical impedance may be a frequency-dependent transfer function that has a magnitude and phase. A mechanical impedance of a relatively large magnitude means that a given magnitude of force applied to a robotic manipulator system will result in a relatively small magnitude of velocity. In this case, the robotic manipulator system is considered colloquially "stiff." In comparison, a mechanical impedance of a relatively small magnitude means that the same given magnitude of force applied to a robotic manipulator system will result in a comparatively larger magnitude of velocity. In this case, the robotic manipulator system is considered colloquially "soft."

It is known to those skilled in the art that reducing the magnitude of a mechanical impedance of a robotic manipulator system reduces the transfer of energy or momentum among a robotic manipulator and one or more objects in its environment during or after a collision event. Reducing the magnitude of the mechanical impedance of a robotic manipulator system is commonly accomplished by reducing feedback control gains associated with a robotic manipulator motion controller. However, this strategy can result in an increase in trajectory tracking error, reducing the accuracy of a robotic manipulator system. Furthermore, well-known fundamental limitations of performance in feedback control systems may place lower limits on the amount that feedback control gains may be reduced, in some applications.

Impedance control is another strategy to modify the impedance of a robotic manipulator, by modulating feedback gains and a tracking reference signal, or by measuring and feeding back a measurement of a force or torque that may affected by contact between a robotic manipulator and an object. Impedance control and its variants such as Hybrid Impedance Control, may make use of a force/torque sensor that is typically mounted in the wrist of a robotic manipulator, located between an end effector and the set of links and joints that comprise a robotic manipulator. However, this approach has some limitations.

SUMMARY

It is an object of some embodiments to provide a mechanism that modifies a robotic manipulator system impedance without compromising some performance metrics of the robotic manipulator system. It is an object of some embodiments to provide a mechanism that therefore modifies, and can specifically reduce, the magnitude of a robotic manipulator system impedance, and therefore can reduce the magnitude of a transfer of energy or momentum among a robotic manipulator and one or more objects in a robotic manipulator environment that occurs during or after a collision event.

Some embodiments are based on the understanding that the transfer of energy or momentum between the robotic manipulator and the object can be minimized by reducing the mechanical impedance of the robotic manipulator system. The mechanical impedance is defined as a quotient of force by velocity, where the force is between the robotic manipulator and the object due to the contact, and the velocity is the result of the force. For linear systems, the mechanical impedance is represented in a frequency domain in a manner analogous to electrical impedance, which is a ratio of voltage to current. In some embodiments, the mechanical impedance is frequency-dependent and has a magnitude and a phase.

Some embodiments are based on the recognition that the mechanical impedance of the robotic manipulator system can be reduced by reducing a feedback control gain associated with a feedback loop of the robotic manipulator system. However, reducing the feedback control gain increases a trajectory tracking error, which in turn leads to inaccurate control of the robotic manipulator system. Thus, there is a need to reduce the transfer of energy or momentum without compromising the performance metrics of the robotic manipulator system, e.g., accuracy and/or trajectory tracking error.

Some embodiments are based on the recognition that the mechanical impedance of the robotic manipulator system can be modified or reduced by measuring a force or torque at the wrist of a robotic manipulator and feeding back the measurements to a robotic motion controller. However, the measured force/torque at the wrist differs from a force due to contact between an end effector and an object, due to the mass and inertia of the end effector, and the non-colocation of a force application and force measurement. Thus, there is a need to modify or reduce the magnitude of the impedance of a mechanical impedance by making use of directly measured forces between a robotic manipulator end effector and the objects being manipulated.

Accordingly, some embodiments are based on the realization that directly measuring a force between a robotic manipulator end effector and an object in contact using one or more tactile sensors, each of which converts an applied force in a known direction to a tactile sensor signal, and suitably aligning the plurality of tactile sensor signals with a coordinate system associated with the motion of a robotic manipulator, compensating the aligned tactile sensor signal, and feeding the result back into a robotic manipulator controller, can modify or reduce the mechanical impedance of a robotic manipulator, without incurring measurement error due to the mass or inertia of an end effector that is associated with conventional force feedback.

Accordingly, one embodiment discloses a feedback controller for controlling a robotic manipulator including one or more actuators mechanically connected to joints of the robotic manipulator for moving an end effector based on measurements of one or more tactile sensors attached to the end effector, the feedback controller includes a circuitry forming modules of the feedback controller.

The modules include a tactile sensor compensator configured to (1) receive measurement signals from one or more tactile sensors, wherein the measurement signals include measurements of one or more magnitudes of one or more forces along one or more directions relative to the tactile sensor and (2) filter the measurement signals to align some or all of the measurement signals to one or more directions of motion of the end effector to produce an impedance shaping signal; and a motion controller configured to (1) determine one or more control signals to the actuators to track a reference state of the end effector based on measurements of the state of the end effector; (2) combine the control signal with the impedance shaping signal to produce control commands and (2) output the determined control commands to the actuators causing a change in the state of the end effector, wherein the state of the end effector includes one or a combination of an end effector position, an end effector velocity, and an end effector force.

Another embodiment discloses a method for feedback control of a robotic manipulator including one or more actuators mechanically connected to joints of the robotic manipulator for moving an end effector based on measurements of one or more tactile sensors attached to the end effector, wherein the method uses a processor coupled with stored instructions implementing the method, wherein the instructions, when executed by the processor carry out steps of the method, including receiving measurement signals from one or more tactile sensors, wherein the measurement signals include measurements of one or more magnitudes of one or more forces along one or more directions relative to the tactile sensor; filtering the measurement signals to align some or all of the measurement signals to one or more directions of motion of the end effector to produce an impedance shaping signal;

determining one or more control signals to the actuators to track a reference state of the end effector based on measurements of the state of the end effector; combining the control signal with the impedance shaping signal to produce control commands;
submitting the determined control commands to the actuators causing a change in the state of the end effector, wherein the state of the end effector includes one or a combination of an end effector position, an end effector velocity, and an end effector force.

DEFINITION OF TERMS

Robotic manipulator. A device used to manipulate objects without direct physical contact by an operator, consisting of a set of one or more rigid links interconnected by one or more joints, some or all of which are actuated.

Robotic manipulator controller. A device for calculating an actuation trajectory, employing feedback to make control corrections.

Robotic manipulator system. The union of a robotic manipulator, its actuators, and a robotic manipulator motion controller.

Impedance. A measure of how much a structure resists motion when subjected to a harmonic force, defined at a point on a structure as the ratio of the force applied at a point to the resulting velocity in the direction of the force at that point.

Admittance. Multiplicative inverse of impedance.

Tactile sensor. A device that measures information arising from physical interaction with its environment, and specifically measures the magnitude of a force applied to a point on a structure, in one or more directions.

Tactile sensor compensator. A device to process tactile sensor signals in order to align them with the reference input to an inner loop compensator, and in order to modify the impedance of the augmented robotic manipulator system.

Augmented robotic manipulator system. A robotic manipulation system and a tactile sensor feedback loop.

Tactile sensor feedback loop A feedback interconnection consisting of a robotic manipulator system, one or more tactile sensors, and a tactile sensor compensator.

Tactile sensor alignment matrix. A linear transformation, possibly parameterized by the robotic manipulator joint position $q$ and end effector position $q_e$, between the vector of measured tactile sensor forces $\hat{F}$ and the input to the inner loop compensator $v$.

Impedance shaping signal. The vector output signal $w$ of the tactile sensor compensator.

Inner loop compensator. A compensator that takes as input a reference trajectory and produces as output an actuation trajectory, in order to compensate in part or whole the effects of gravity, damping, friction, coordinate transformation or multi-body motion.

Outer loop compensator. A compensator that takes as input a reference trajectory representing a desired robotic manipulator motion, and a set of measured robotic manipulator joint positions and possibly one or more of their derivatives by time, and computes an output signal intended to cause the robotic manipulator system to track the reference trajectory.

BRIEF DESCRIPTION OF THE DRAWINGS

FIG. 12 shows a flowchart of an exemplar method according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance" and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
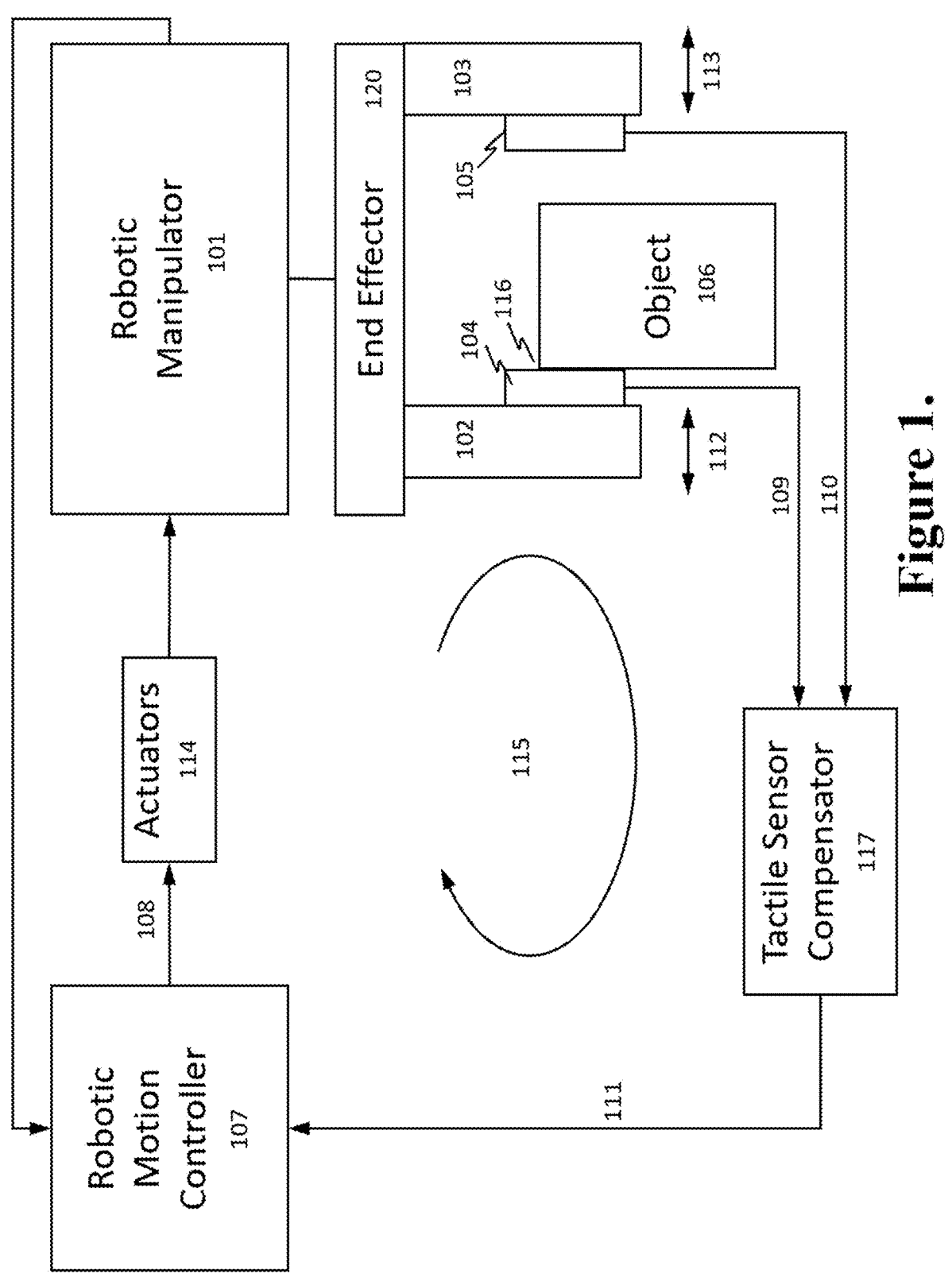
FIG. 1 shows a block diagram of a tactile sensor feedback loop according to some embodiments.

FIG. 1 shows a block diagram of a tactile sensor feedback loop 115 according to some embodiments. The tactile sensor feedback loop 115 includes a robotic manipulator 101, mechanically connected to an end effector 120, which includes fingers 102 and 103, on which tactile sensors 104 and 105 are mounted. Object 106 is shown to be in contact with tactile sensor 104. Tactile sensors 104 and 105 convert force measurements at tactile sensors 104 or 105, respectively, into one or more signals 109, 110, which are fed to the tactile sensor compensator 117. The tactile sensor compensator 117, processes the tactile sensor signals 109, 110 to align them with a robotic manipulator coordinate system, and filters the result to produce the output 111 of the tactile sensor compensator. The output of the tactile sensor compensator 111 consists of one or more signals, collected into a signal vector denoted the impedance shaping signal, which is fed into a robotic motion controller 107, which in turn outputs a set of one or more signals 108 to a set of robotic manipulator actuators 114, which are mechanically connected to the joints of a robotic manipulator 101, to close a tactile sensor feedback loop 115, which itself is comprised of a robotic manipulator 101, including an end effector 120, a set of one or more tactile sensors 104, 105, a tactile sensor compensator 117, a robotic motion controller 107, a set of one or more robotic manipulator actuators 114, and signal interconnections 108, 109, 110 and 111.

In FIG. 1, the object 106 is shown to be in contact 116 with tactile sensor 104, and is not in contact with tactile sensor 105. This is one embodiment, and an embodiment is not limited to only one tactile sensor to be in contact with one or more objects. In FIG. 1, each of the end effector fingers 102 and 103 may move independently to the left and right, 112, 113, respectively, and the robot manipulator may move to the left and right, 112 and 113, respectively. It is understood that FIG. 1 diagrams one embodiment, and other embodiments are not limited to a robotic manipulator restricted to motion in only one dimension, nor is the number of degrees of freedom of an end effector limited to one or two fingers, nor is the end effector motion is limited to only linear motion. Other embodiments may have one or more rotational or translational degrees of freedom in the end effector, one or more rotational or translational degrees of freedom in a robotic manipulator, and one or more tactile sensors.

One effect of a tactile sensor feedback loop 115 is to modify the impedance of a robotic manipulator system as it is defined at one or more points of contact 116 with one or more objects 106. Here a robotic manipulator system is augmented to be the union of a robotic manipulator system and a tactile sensor feedback loop. Herein this union is referred to as an augmented robotic manipulation system. One effect of this embodiment is to modify, and in particular, to reduce the magnitude of an impedance of an augmented robotic manipulator system as it is defined at one or more points of contact between a robotic manipulator end effector and objects 116, when compared to a conventional robotic manipulator system, which by definition lacks a tactile sensor feedback loop 115. This results in a modification, and in particular, a reduction of the magnitude of a transfer of energy or momentum among a robotic manipulator and one or more objects in the robotic manipulator environment that occurs during or after a collision event.

Some embodiments are based on recognizing that the feedback loop of a feedback controller of FIG. 1 can reduce the impedance of the robotic manipulator. Such a recognition is based on some understandings. First, a force or torque that is measured by a force/torque sensor that is mounted at a wrist is not the same as a force or torque at one or more points of contact between an object and an end effector, but rather it is a force or torque at a wrist, which is removed in location from one or more points of contact. A measured force or torque at a wrist is affected by the mass or inertia of an end effector, and will therefore exhibit a measurement error caused by an end effector motion and its inertia, and also caused by the effect of gravity on an end effector. For this reason, the magnitude of a robotic manipulator system velocity is typically reduced, in order to reduce a measurement error of force or torque made at a wrist due to the inertia of an end effector. This adversely affects the productivity of a robotic manipulator system. Further, resolution of forces or torques due to contact, which may be small in magnitude relative to a set of measured forces or torques at a wrist due to gravity or inertia, can be limited by constraints on dynamic range of measurement, for example.

Second, a wrist-mounted force/torque sensor can only measure the sum total of all forces or torques acting at multiple points of contact. It cannot resolve individual forces or torques that are associated with a plurality of contacts. As such, the impedance control may have a limited effect in modifying the impedance of a robotic manipulator, and in reducing the magnitude of a transfer of energy or momentum among a robotic manipulator system and one or more objects in its environment during or after a collision event.

Therefore, strategies to reduce the magnitude of the transfer of energy or momentum among a robotic manipulator system and one or more objects in its environment during or after a collision event may be insufficient or impractical for some robotic manipulator applications. To that end, some embodiments provide a means to reduce the magnitude of the transfer of energy or momentum among a robotic manipulator and objects in its environment during or after a collision event without requiring impractical modification to the robotic manipulator or without compromising performance metrics of a robotic manipulator system such as accuracy or productivity metrics, for example.

Some embodiments are based on recognizing that when feedback control determines one or more control signals to the actuators to track a reference state of the end effector based on measurements of the state of the end effector, the combination of the control signals with the measurements of the tactile sensors changes the impedance. To that end, in some embodiments, the feedback control for controlling a robotic manipulator includes receiving measurement signals from one or more tactile sensors and filtering the measurement signals to align them with the directions of motion of the end effector to produce an impedance-shaping signal. The feedback control determines one or more control signals to the actuators to track a reference state of the end effector based on measurements of the state of the end effector and combines the control signal with the impedance shaping signal to produce control commands. Also, the feedback control may include submitting the determined control commands to the actuators causing a change in the state of the end effector, where the state of the end effector includes one or a combination of an end effector position, an end effector velocity, and an end effector force.

Figure 2:
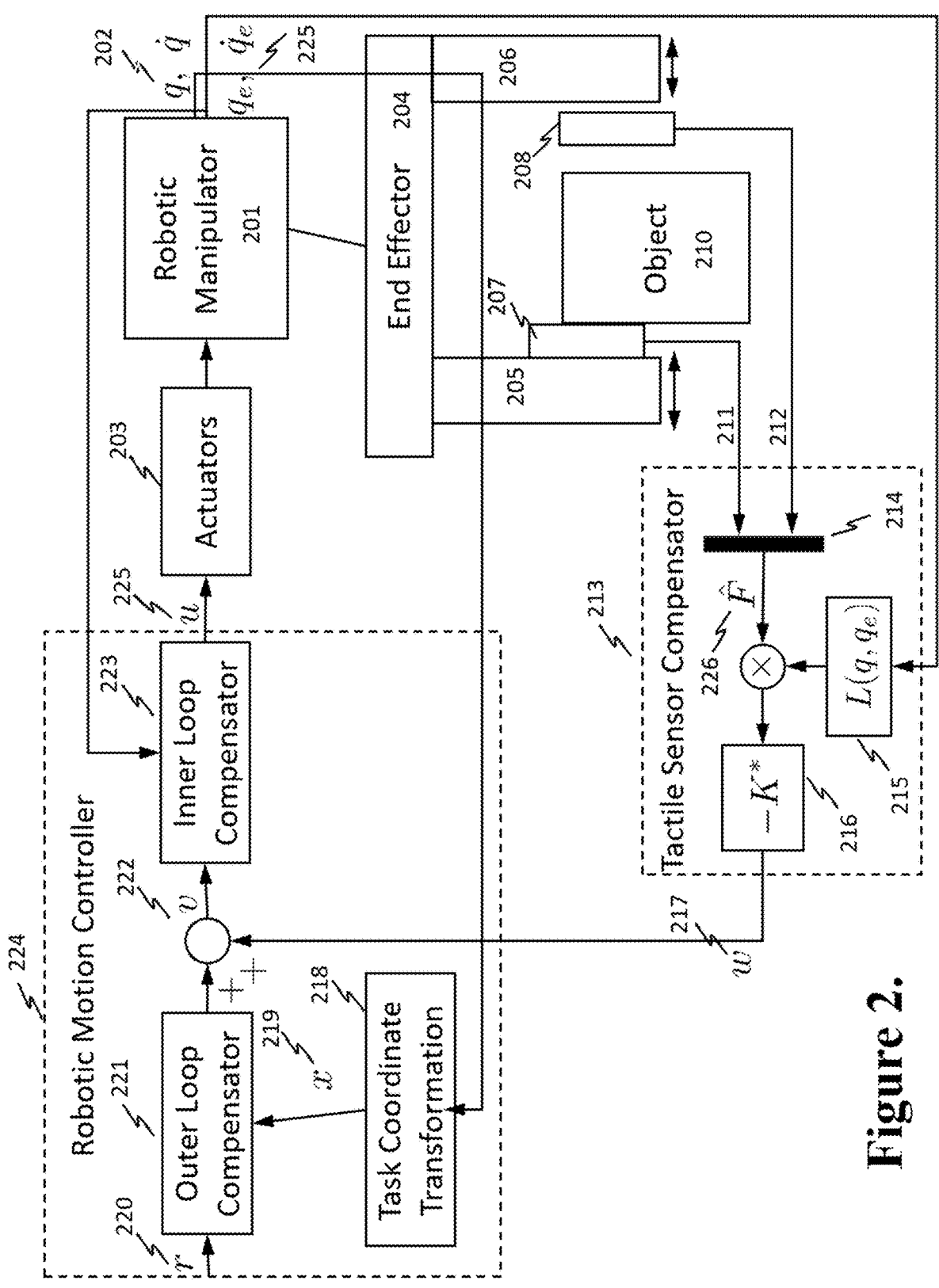
FIG. 2 shows a block diagram of a tactile sensor feedback loop according to another embodiment with a robotic manipulator and end effector, including fingers and, tactile sensors and, and an object in contact with a tactile sensor.

FIG. 2 shows a block diagram of a tactile sensor feedback loop according to another embodiment with robotic manipulator 201 and end effector 204, including fingers 205 and 206, tactile sensors 207 and 208, and an object 210 in contact with tactile sensor 207. An embodiment of the tactile sensor compensator 213 is shown which collects the tactile sensor measurement signals 211 and 212 into signal vector F 214, multiplies by a tactile sensor alignment matrix $L(q,q_e)$ 215, to provide an input to the compensator $-K^*$ 216, whose output is impedance shaping signal w 217. This is fed back into a robotic motion controller 224 to form a cascade feedback structure, with an inner loop compensator 223 as part of an inner feedback loop, and an outer loop compensator 221 forming a part of an outer feedback loop. The outer loop is realized in task coordinates x 219, computed via a task coordinate transformation 218 from the measured joint positions q 202. The outer loop compensator output signal is summed with the impedance shaping signal w 217 to produce v 222, which is applied as input to the inner loop compensator 223.

In the embodiment of FIG. 2 joint positions q and velocities $\dot{q}$ 202 of robotic manipulator 201 are measured and fed back to an inner loop compensator 223, which is an element of a robotic motion controller 224. The inner loop compensator 223 computes the actuation command u 225, which is applied to a set of actuators 203. In some embodiments, an inner loop compensator computes a value u 225 for a set of actuators, that reduces or eliminates the effect of gravity on the robotic manipulator. In some embodiments, an inner loop compensator computes a value for u 225 that reduces or eliminates the effect of nonlinear dynamic forces and torques, such as Coriolis, centripetal or friction forces or torques. In some embodiments, the effect of these forces or torques may be small or immaterial, such as when a robotic manipulator is arranged in a gravity-free field, and an inner loop compensator may compensate some or all of these forces or torques, or may be the identity operator.

The embodiment shown in FIG. 2 also includes an outer loop compensator 221, which takes as input a reference command r 220, and possibly its derivatives by time, and a measured robotic manipulator position x, and possibly its derivatives by time, expressed in task coordinates and computed via a task coordinate transformation 218 from the measured robotic manipulator position q and velocity $\dot{q}$ 202. This feedback loop causes the robotic manipulator to track the reference signal r 220. In some embodiments, a task coordinate transformation 218 may be a function dependent on robotic manipulator position 202. In other embodiments, a task coordinate transformation 218 may be independent of the robotic manipulator position 202, such as with a cartesian robotic manipulator. Therefore, in some embodiments, a task coordinate transformation may be the identity operator.

The embodiment shown in FIG. 2 includes feedback loops corresponding to the inner loop compensator 223, the tactile sensor compensator 213 and the outer loop compensator 221, that are arranged in a cascade structure whereby the impedance shaping signal w 217 is fed back to signal v 222 that is intermediate between an inner feedback loop, compensated by an inner loop compensator 223, and an outer feedback loop, compensated by an outer loop compensator 221.

Figure 3:
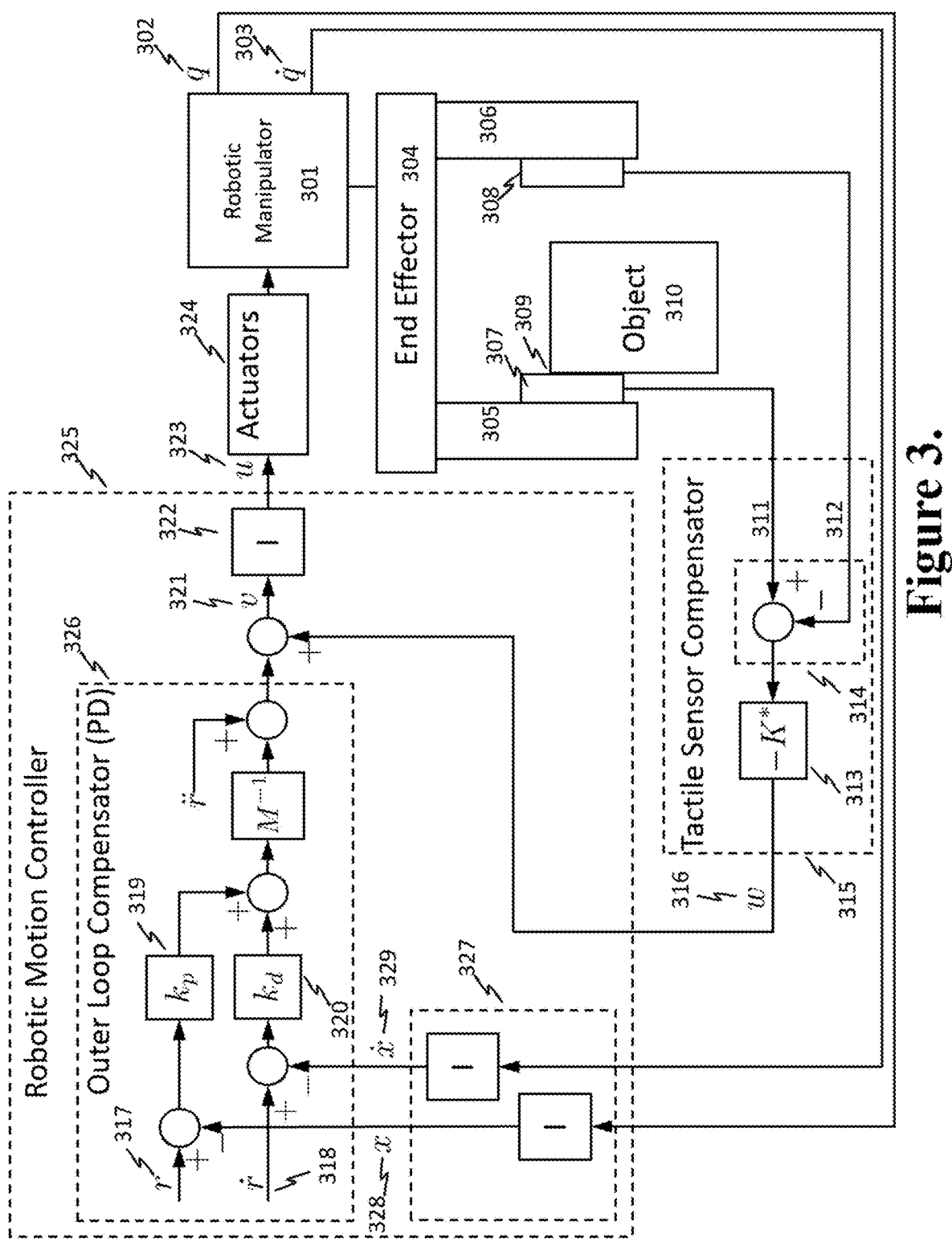
FIG. 3 shows a schematic of an embodiment of a tactile sensor feedback loop, in which the robotic motion controller includes an outer loop compensator that is realized as a proportional-derivative (PD) type compensator.

FIG. 3 shows a schematic of an embodiment of a tactile sensor feedback loop, in which the robotic motion controller 325 includes an outer loop compensator 326 that is realized as a proportional—derivative (PD) type compensator. The impedance shaping signal w 316 is computed by the tactical sensor compensator 315 by by taking the difference between tactile sensor signals 311 and 312, which aligns the measured forces at tactile sensors 307 and 308, respectively, to the inner loop reference input signal v 321. In this embodiment, the tactile sensor alignment matrix is L=[1−1], and the product of L 215 and $\hat{F}$ 226 is represented in this embodiment by the block 314. The output of 314 is filtered through tactile sensor gain −K* 313, resulting in the impedance shaping signal w 316, which is added to output of the outer loop compensator 326 to produce the reference input to the inner loop compensator v 321. In this embodiment, the inner loop compensator 322 is the identity operator, so that u=v (323 and 321, respectively). In this embodiment, the task coordinate transformation 327 is the identity operator, so that x=q (328 and 302 respectively) and $\dot{x}=\dot{q}$ (329 and 303, respectively).

In FIG. 3, the robotic manipulator 301 is mechanically connected to the end effector 304, which includes fingers 305 and 306 carrying tactile sensors 307 and 308, respectively, and is shown in contact 309 with an object 310. The robotic motion controller may produce actuation-related signals applied to the actuators 324, which in turn drive the robotic manipulator 301. A reference command r (317) is provided to the outer loop compensator and its time derivative $\dot{r}$ (318) is also provided. Within the outer loop compensator (PD) 326, proportional gain $k_p$ 319 and derivative gain $k_d$ 320 are applied to corresponding error signals to generate an output that is combined with the impedance shaping signal, as shown, prior to application to the inner loop compensator and subsequent actuation.

Figure 4:
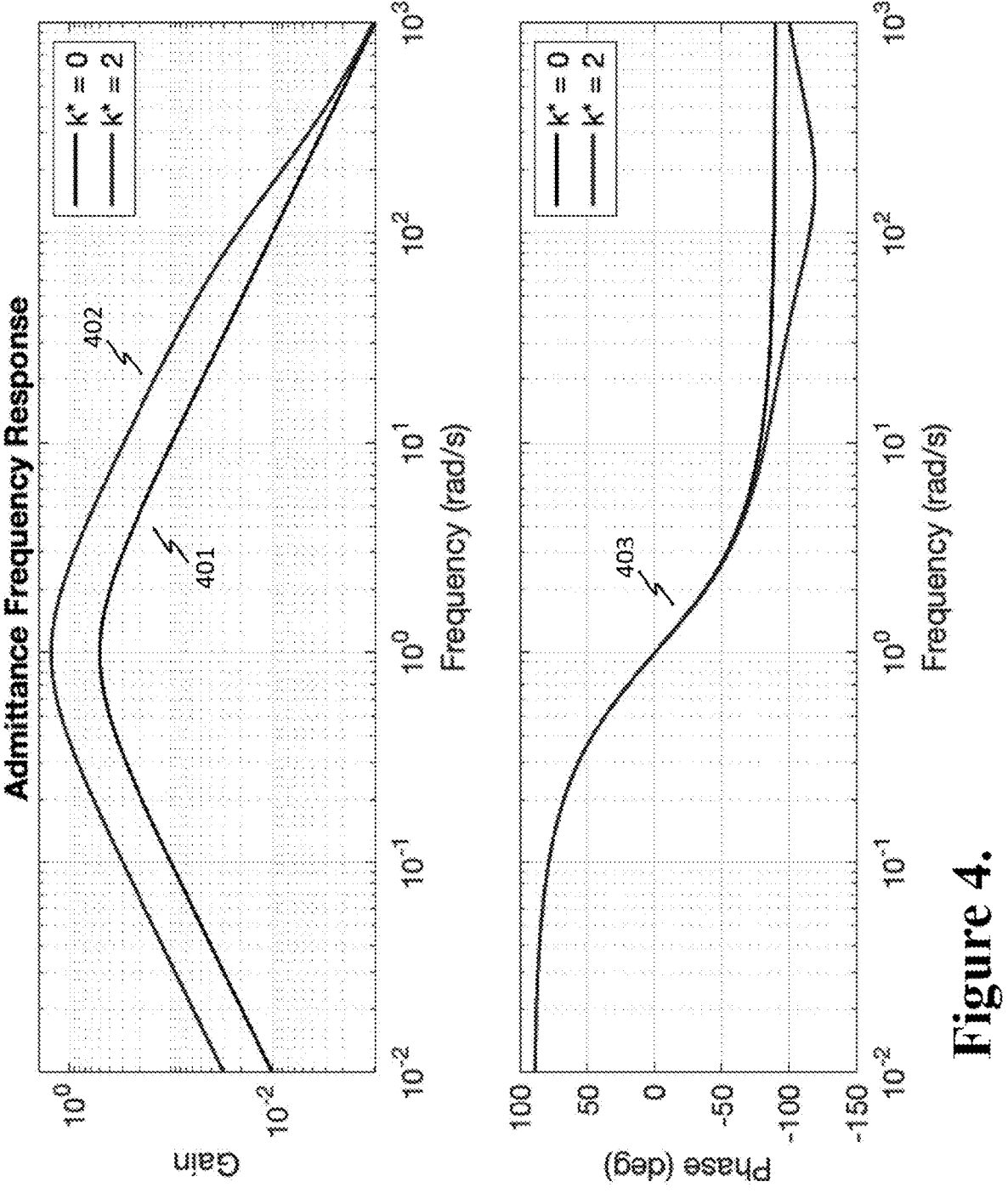
FIG. 4 shows a schematic of a frequency response of the admittance, which is the inverse of impedance, of the embodiment in FIG. 3.

FIG. 4 shows a frequency response of the admittance, which is the inverse of impedance, of the embodiment in FIG. 3, for particular numerical values of components of robotic manipulator such as masses, inertias and other geometric and kinematic parameters. FIG. 4 shows the effect of a tactile sensor feedback loop on the magnitude and phase of the admittance at a tactile sensor point of contact, with value k*=2, by increasing the magnitude of the admittance 402, compared to the value of k*=0 401. The effect is to increase the magnitude of the admittance by approximately 2 dB over the bandwidth of a tactile sensor feedback loop, which in this particular embodiment is 100 rad/s, while having negligible effect on the phase 403. This corresponds to a decrease in the impedance over this frequency range of the same amount. Note that the admittance of the augmented robotic manipulator system is modified relative to the conventional robotic manipulator system in the bandwidth of the tactile sensor feedback loop, but the admittance cannot be changed outside this bandwidth through the use of feedback, due to fundamental limitations of feedback. At frequencies above 100 rad/s the admittance is limited by the mass of a robotic manipulator system, and can only be increased by reducing the mass of a robotic manipulator.

Figure 5:
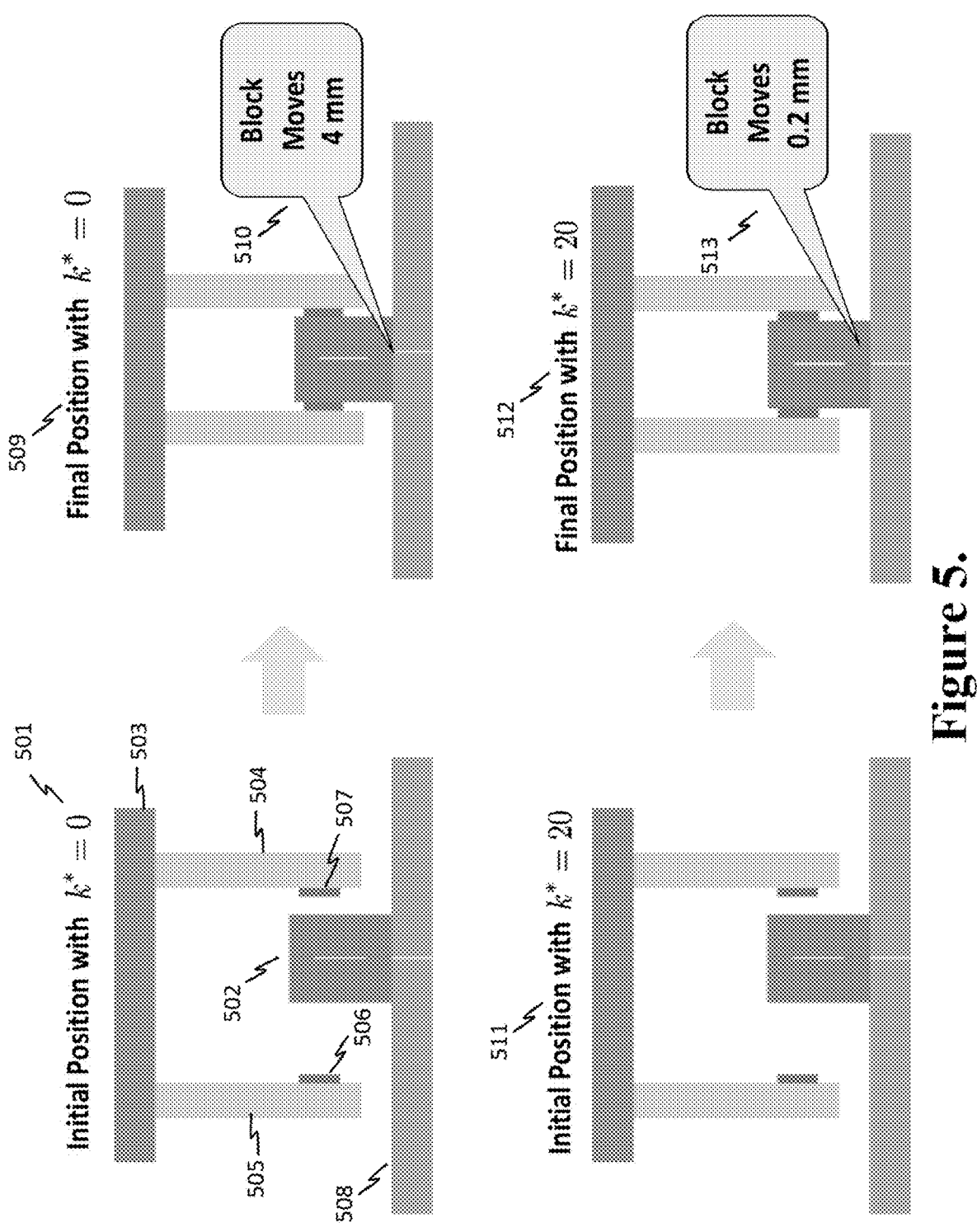
FIG. 5 shows a schematic of animations of two simulations showing the effect of the tactile sensor feedback loop according to some embodiments.

FIG. 5 shows a schematic of animations of two simulations showing the effect of the tactile sensor feedback loop according to some embodiments. In the initial configuration 501, a block is off-center from two parallel fingers 504 and 505, on which tactile sensors 506 and 507 are mounted. A simulation of the system in FIG. 4 with k*=0 was run, during which the fingers 504, 505 close vise-like on the block 502, The fingers close on the block with equal and opposite motion, resulting in tactile sensor 507 contacting the block before tactile sensor 506. With the feedback gain k*=0, the tactile sensor feedback loop is effectively open, so tactile sensor measurements are not used. As a result, at the end of the simulation 509, the block is displaced from its initial position 510, a distance of 4 mm in this instance. Repeating the same simulation with the tactile sensor compensator gain set to k*=20, 511, results in a much smaller displacement, 512, of 0.2 mm, because the tactile sensor feedback loop has reduced the robotic manipulator system impedance, resulting in a reduction of the transfer of energy or momentum during or after the collision events between the tactile sensors 507 and 506, respectively, and the object being manipulated, in this case the block.

Figure 6:
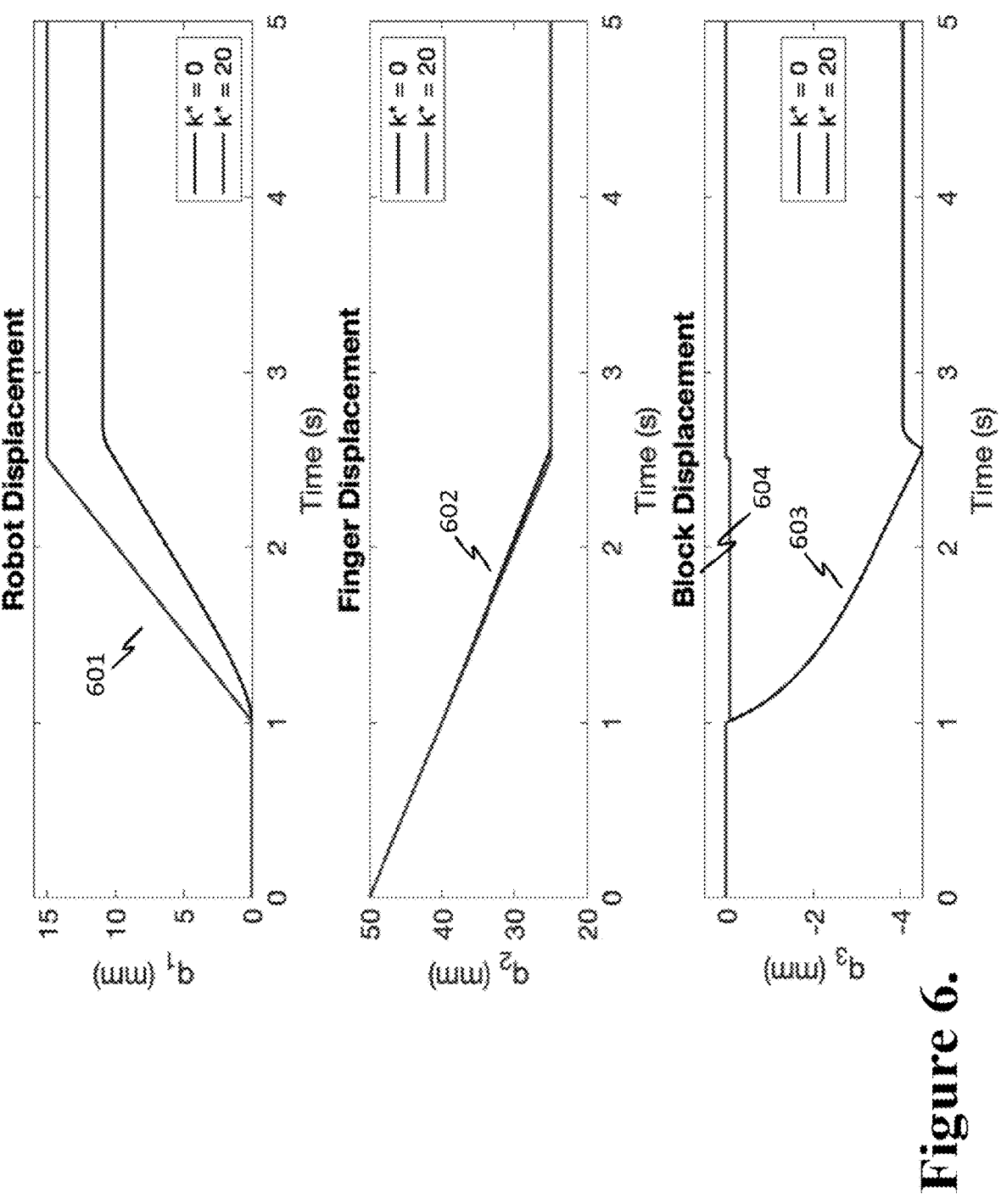
FIG. 6 shows a schematic of time trajectories of the robot manipulator horizontal displacement for the two simulations diagrammed in FIG. 5.

FIG. 6 shows a schematic of time trajectories of the robot manipulator horizontal displacement $q_1$, the finger displacement $q_2$, and the block displacement $q_3$, for the two simulations diagrammed in FIG. 5. The time trajectories of the simulation are showing the robotic manipulator displacement 601, the finger displacements 602, and the block displacement 603 and 604 for values of k*=0 and k*=20, respectively. The final block displacement 604 is reduced from 4 mm to 0.2 mm by the action of a tactile sensor feedback loop, which has the effect of moving the robotic manipulator around the block location 601, instead of moving the block 604. The block displacement is reduced because less energy or momentum was transferred to it during or after the collision events, showing the effectiveness of a tactile sensor feedback loop in reducing the transfer of energy or momentum during or after collision events.

Figure 7:
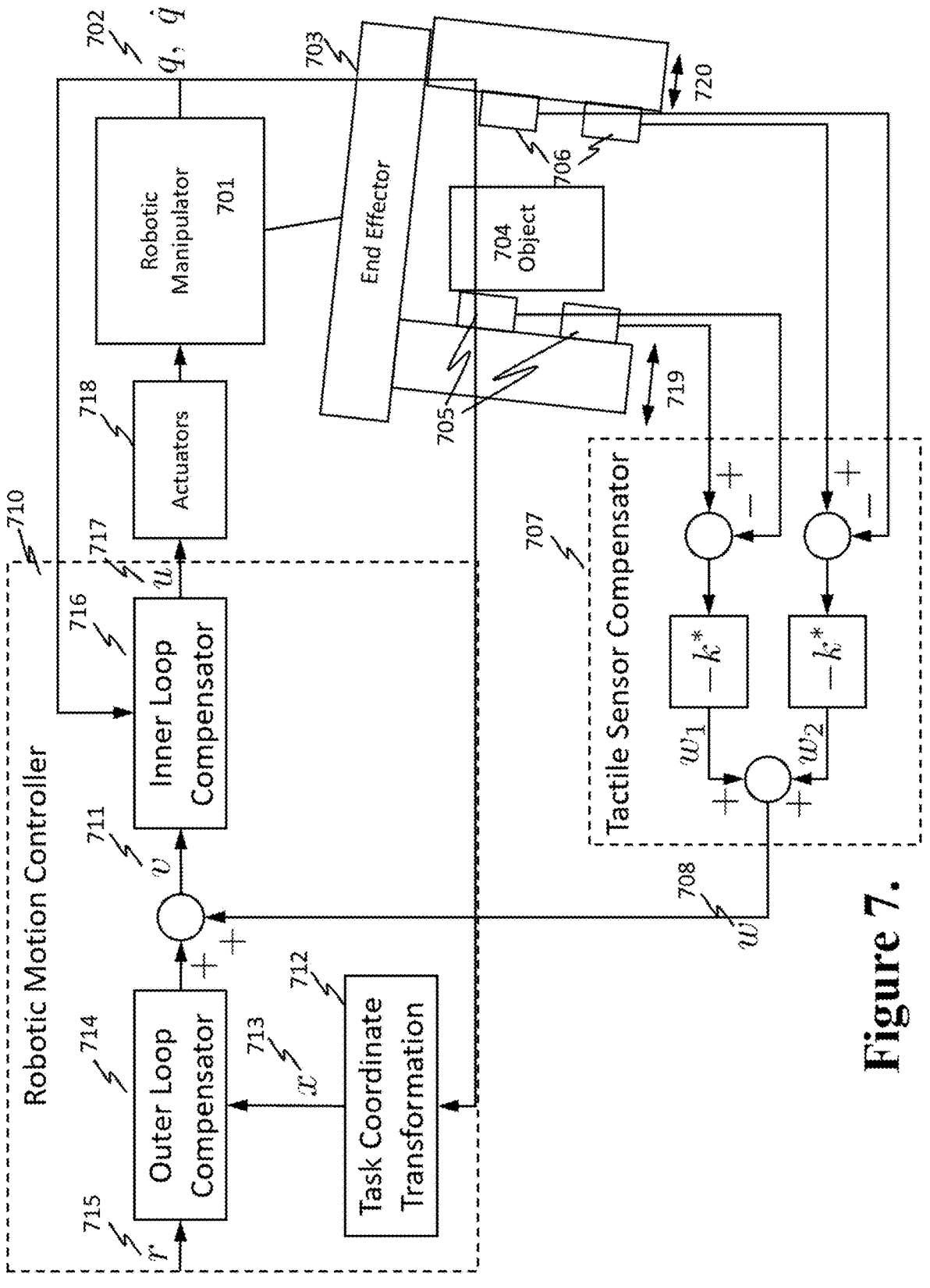
FIG. 7 shows a block diagram of an embodiment of a tactile sensor feedback loop, with a robotic manipulator and end effector, in which the end effector has a rotational degree of freedom.

FIG. 7 shows a block diagram of an embodiment of a tactile sensor feedback loop, with robotic manipulator 701 and end effector 703, in which the end effector has a rotational degree of freedom. In this embodiment, the tactile sensor compensator takes the difference between pairs of tactile sensors 705 and 706, mounted on the two fingers of the end effector. This aligns their measurements with the rotational direction of actuation. The tactile sensor compensator also includes a constant gain −k* to produce impedance shaping signal w 708, which is fed back to the robotic motion controller 710 at a point 711 between an inner loop compensator 716 and an outer loop compensator 714, to close the tactile sensor feedback loop.

In FIG. 7, 702 denotes joint coordinates (e.g., joint position q, and optionally joint velocity $\dot{q}$) of the robotic manipulator used to represent the manipulator state. The object contacted by the end effector is labeled 704. The tactile sensor compensator is labeled 707. The task coordinate transformation is labeled 712, and provides task-space coordinates x 713 (e.g., a task-space position or orientation coordinate) from the joint coordinates. A reference command is provided as r 715. The actuation command output by the inner loop compensator is labeled u 717, and is provided to the actuators 718, which drive the robotic manipulator. Reference numerals 719 and 720 denote the two end-effector fingers that carry tactile sensors 705 and 706 and that may move independently, for example leftward and rightward motion of the respective fingers.

Figure 8:
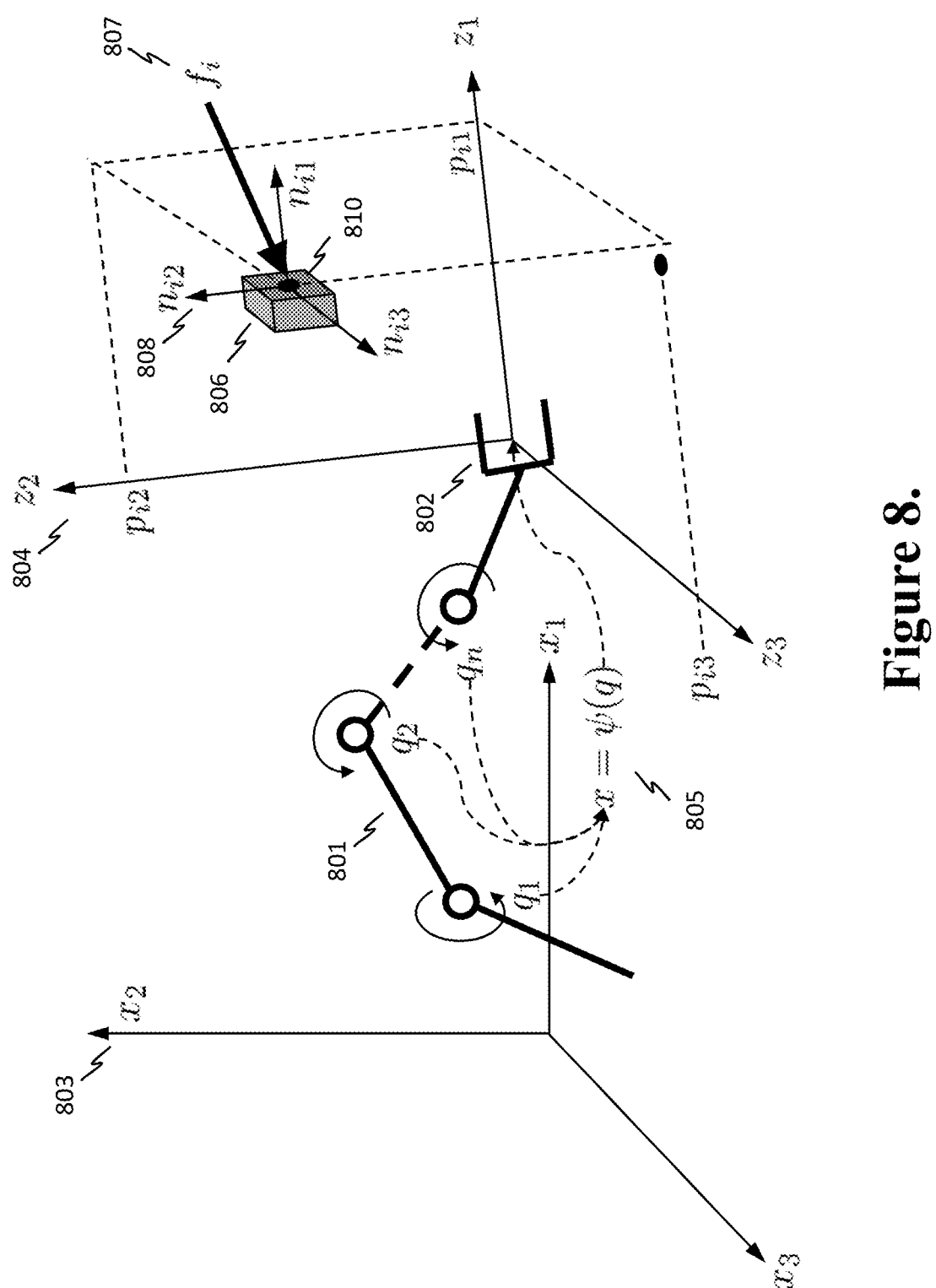
FIG. 8 shows a schematic of coordinate frames used by some embodiments when a tactile sensor measures the magnitude and direction of an applied force.

FIG. 8 shows a schematic of coordinate frames used by some embodiments, when a tactile sensor measures a magnitude and direction of an applied force. A robotic manipulator 801, including end effector 802, includes a set of n joints whose positions $q_i$, $1 \le i \le n$ are measured, and used as input to the forward kinematics 805, to compute the position and orientation of the end effector frame 804 centered at 802.

In this frame is located a tactile sensor 806, at point $p_i$. Attached to the tactile sensor 806 is a frame 808 with coordinates $n_i$. A force $f_i$ 807 is shown applied to the tactile sensor 806.

Figure 9:
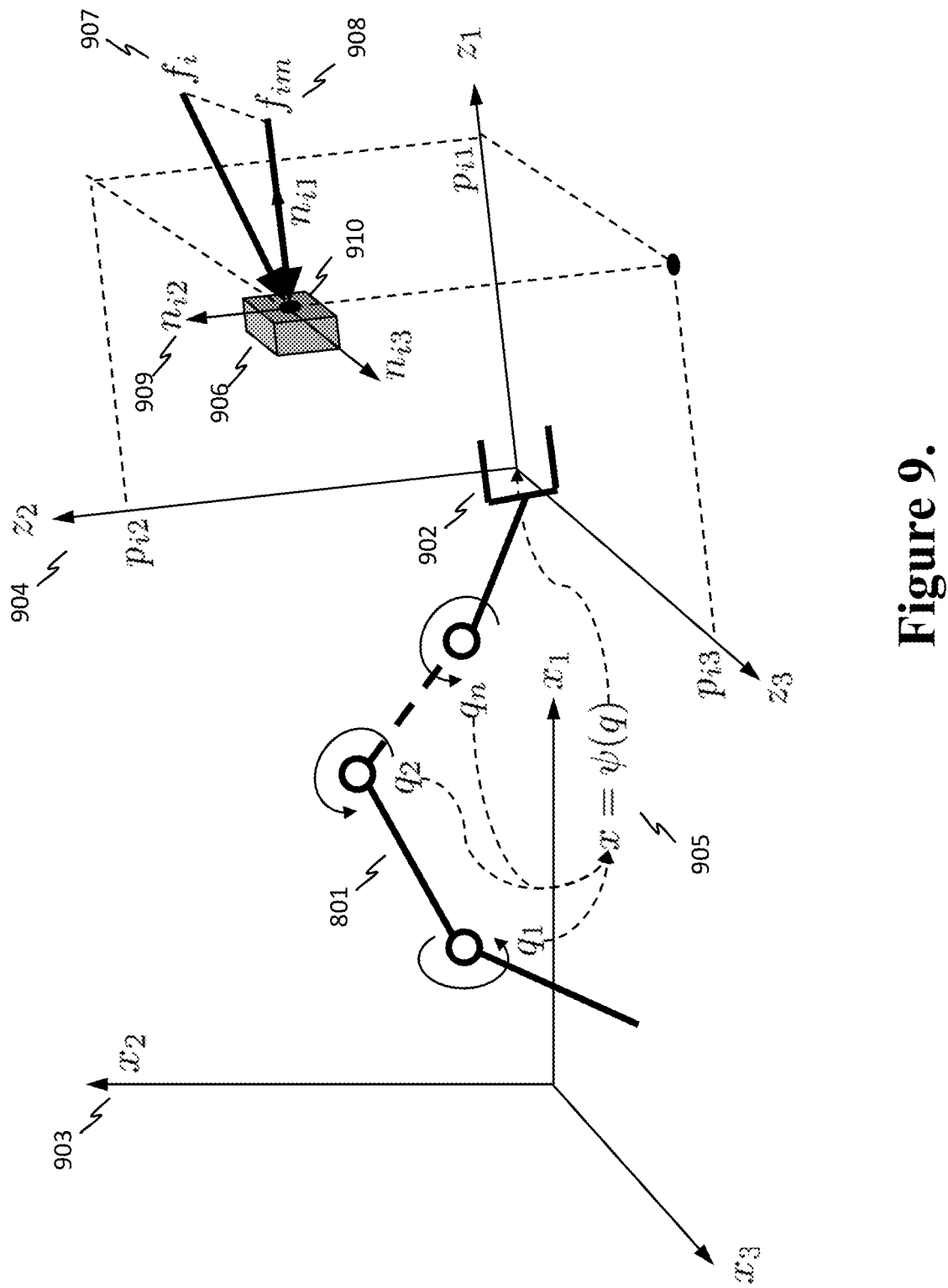
FIG. 9 shows a schematic of coordinate frames used by some embodiments when a tactile sensor measures the magnitude of an applied force in a specified direction.

FIG. 9 shows a schematic of coordinate frames used by some embodiments, when a tactile sensor measures a magnitude of an applied force in a specified direction. A robotic manipulator 901, including end effector 902, includes a set of n joints whose positions $q_i$, $1 \leq i \leq n$ are measured, and used as input to the forward kinematics 905, to compute the position and orientation of the end effector frame 904 centered at 902. In this frame is located a tactile sensor 906, at point $p_i$. Attached to the tactile sensor 906 is a frame 909 with coordinates $n_i$. A force $f_i$ 907 is shown applied to the tactile sensor 906, but the tactile sensor 906 can measure only the magnitude of the applied force 907 in the direction of $n_{i1}$, 908.

Figure 10:
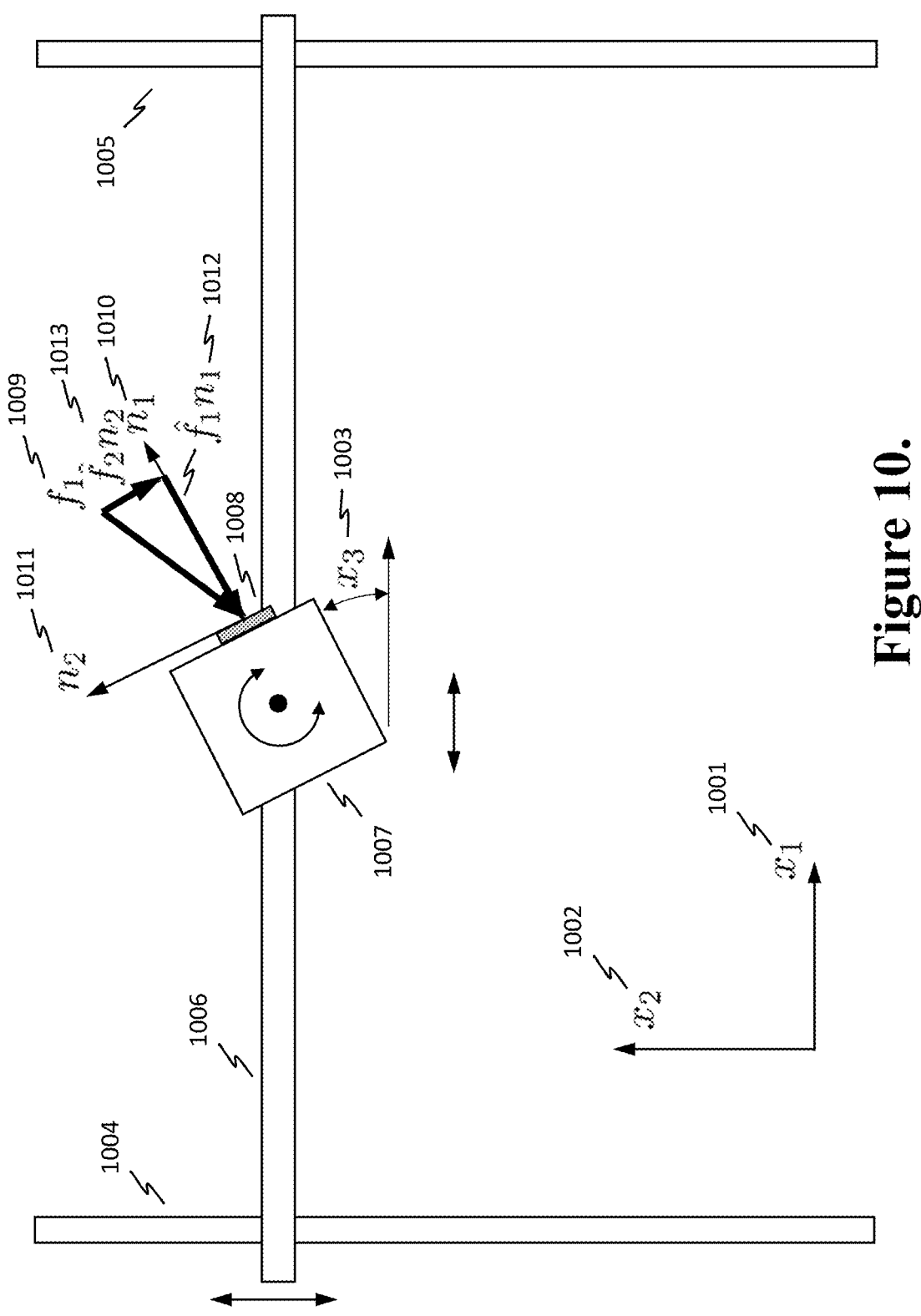
FIG. 10 shows a schematic of an embodiment for a 3-degree-of-freedom robot with two translational degrees of freedom and one rotational degree of freedom.

FIG. 10 shows a schematic of an embodiment for a 3 degree of freedom robot with two translational degrees of freedom and one rotational degree of freedom. Rail 1006 slides along fixed rails 1004 and 1005. In turn, an end effector 1007 slides along rail 1006, and may also rotate 1103. A tactile sensor 1008 of the type that measures both magnitude and direction of applied force $f_1$ 1009 is mounted on the end effector 1007. A frame is attached to the tactile sensor 1008, with principle coordinates $n_1$ 1010 and $n_2$ 1011. The tactile sensor 1008 measures the components of the applied force 1009 along direction $n_1$ 1012 and also $n_2$ 1013.

Exemplar Embodiments and Implementations

One exemplar embodiment includes an n-degree-of-freedom robotic manipulator with an attached end effector, on which a number $M \geq 1$ of tactile sensors are mounted at points denoted $p_i$, for $1 \leq i \leq M$. The present invention defines a tactile sensor as a device that measures the magnitude of a force applied to a point on a structure, in one or more directions.

For some types of tactile sensors, both the magnitude and direction of an applied force vector $f_i$ are measured. As shown in FIG. 8, for this type of tactile sensor 806, an applied force vector $f_i$ 807 may be projected along a set of principle axes $n_{ij}$, for $1 \leq j \leq m$, of a coordinate frame 808 that is attached to the tactile sensor at point $p_i$ 810. Therefore, an applied force vector $f_i$ may be decomposed as $$f_i = \sum\nolimits_{j=1}^{m} \hat{f}_{ij} \cdot n_{ij} \qquad (1)$$

where $m \leq 3$ is the dimension of the measurement, $n_{ij}$ for $1 \leq j \leq m$ are coordinates of a coordinate frame 808 attached to the tactile sensor, located at point $p_i$ 810 defined in a coordinate frame 804 attached to the end effector 802, and the scalar quantities $\hat{f}_{ij}$ are the measurements.

For some types of tactile sensors, the direction of a measured applied force vector is along a direction that is fixed and constant in a frame of reference attached to the tactile sensor. For example, some types of piezoelectric sensors may measure an applied force in a direction perpendicular to the surface of the sensor. As shown in FIG. 9, for this type of sensor, let $n_{ij}$ for $1 \leq j \leq m$, denote a set of principle axes of a coordinate frame 909 attached to the tactile sensor 906 located at point $p_i$ 910 defined in a coordinate frame 904, which is attached to the end effector 902. Let $n^*$ denote the direction of force measurement, so that $n^*$ can be written as a fixed linear combination of the coordinates $n_{ij}$ 909. Then the measured component 908 of an applied force $f_i$ may be expressed as $$f_{im} = \hat{f}_{im} \cdot n^* = \hat{f}_i \cdot \sum\nolimits_{j=1}^{m} \alpha_j n_{ij}, \qquad (2)$$

where $\alpha_j$, $1 \leq j \leq m$ is a fixed, real-valued quantity, and the scalar time-varying quantity $\hat{f}_{im}$ is the measurement. Note that the orthogonal complement of a measured force, $f_{ip} = f_i - f_{im}$ is not measured for this type of tactile sensor, but can affect the behavior of a robotic manipulator.

Other types of tactile sensors may measure only a subset of the components of an applied force. However, in all embodiments of this invention, a plurality of one or more tactile sensors provide a plurality of force measurements at a plurality of one or more points denoted $p_i$, each located on an end effector. Each force measurement is along a direction that can be represented as a linear combination of coordinate vectors defining a frame at a point $p_i$, denoted $n_{ij}$. For purposes of notation, an embodiment includes a number N of tactile force measurements $\hat{f}_k$, each of which is a scalar-valued function of time, $1 \leq k \leq N$. For each scalar $\hat{f}_k$ there exists a vector $n_k$ defined relative to a coordinate frame fixed to that tactile sensor, defining the direction of that measurement. The vector $n_k$ can be expressed as a linear combination of the coordinates $n_{ij}$ that define a frame at point $p_i$, and that is associated with the scalar force measurement $\hat{f}_k$.

The embodiments are not limited to a specific number of degrees-of-freedom. Further, the embodiment is not limited to a fully actuated robotic manipulator, where the n is also the number of actuators. Other embodiments of the invention allow for a smaller number of actuators than degrees of freedom, known as an under-actuated robotic manipulator, or robotic manipulators that have more than six actuators, which may be known as over-actuated robotic manipulators. For simplicity of exposition, the following describes an embodiment with a number of actuators equal to the number of degrees of freedom, denoted n.

A dynamic model for an n-degree-of-freedom robotic manipulator and N tactile sensor measurements may be expressed as $$D(q)\ddot{q} + c(q,\dot{q}) + d(\dot{q}) + g(q) = Bu + \sum\nolimits_{k=1}^{N} J_k^T(q, q_e) n_k \hat{f}_k + \tau \qquad (3)$$

where q is an n-dimensional vector of generalized joint coordinates, $\dot{q}$ and $\ddot{q}$ denote its first and second derivatives with respect to time (joint velocity and acceleration), $q_e$ is an $n_e$-dimensional vector of generalized end effector coordinates, D is an n×n inertia matrix, c is an n-dimensional vector of Coriolis and centripetal forces or torques, g is an n-dimensional vector of gravity forces or torques, d is an n-dimensional vector of damping forces or torques, B is an n×n constant matrix mapping actuator forces or torques to the joints, u is an n-dimensional vector of actuator forces or torques, $\hat{f}_k n_k$ is the measured force vector acting on the robot manipulator at point $p_i$ on the end effector, $J_k$ is an $n_T$×n Jacobian for measured force $\hat{f}_k n_k$ acting at point $p_i$ in the $n_k$ direction, point $p_i$ is defined in a frame of reference at the end effector, and is in general a function of $q_e$, for $1 \leq k \leq N$, $n_T$ is the number of cartesian degrees of freedom of the end effector, which satisfies $1 \leq n_T \leq 3$, and $\tau$ represents the sum of forces and torques that are applied at points $p_i$, or other points, but are not measured by tactile sensors.

A forward kinematics map of the robotic manipulator, 805, 905 in FIGS. 8, 9, respectively, may be denoted as $$x = \psi(q), \qquad (4)$$

which is a map from the joint position vector q to the location and orientation of an end effector frame 804 or 904, expressed in a task coordinate frame as shown in FIGS. 7 and 8. The task coordinates x 803 or 903, may be cartesian, but other coordinate systems such as cylindrical or radial are also possible. The corresponding robotic manipulator Jacobian is then $$J(q) = \frac{\partial \psi(q)}{\partial q}. \qquad (5)$$

In some embodiments, the forward kinematics includes 3 translational degrees of freedom, and 3 rotational degrees of freedom, so that the task frame 803 or 903, diagrammed in FIGS. 8 and 9, includes a full 3 degrees of freedom in position and orientation, and n=6. However, other embodiments include robotic manipulators with fewer than 3 degrees of freedom in translation or orientation, or more than 3 degrees of freedom in translation or orientation.

As is known to those skilled in the art, the dynamic model (3) may be expressed in task coordinates by differentiating (4) by time twice, giving $\dot{x}=J(q)\dot{q}$ and $\ddot{x}=J(q)\ddot{q}+\dot{J}(q,\dot{q})\dot{q}$, solving for $\ddot{q}$, and substituting the result into (3), giving $$DJ^{-1}\ddot{x} - DJ^{-1}\dot{J}\dot{q} + c + d + g = Bu + \sum_{k=1}^{N} J_k^T n_k \hat{f}_k + \tau, \qquad (6)$$

where dependencies on q, $\dot{q}$ and $q_e$ are dropped for compactness of notation. Here the dot notation is used to denote derivative by time. This assumes that the inverse of the Jacobian, $J^{-1}$ exists, so the robotic manipulator is operating away from kinematic singularities. Defining $$a = -DJ^{-1}\dot{J}\dot{q} + c + d + g \qquad (7)$$

allows for a compact expression of the robotic manipulator dynamics in task coordinates:

$$DJ^{-1}\ddot{x} + a = Bu + \sum_{k=1}^{N} J_k^T n_k \hat{f}_k + \tau. \qquad (8)$$

One embodiment includes an inner loop compensator as a part of an inner loop feedback, defined by $$u = B^{-1}(a + DJ^{-1}v). \qquad (9)$$

This linearizes the dynamics from input v to task coordinate x, and decouples the dynamics along each of the coordinate axis of x. This is known as feedback linearization to those skilled in art. Some embodiments of an inner loop compensator may not include so-called higher-order terms from (9), such as some or all of the terms of the Coriolis or centripetal terms, or may not include some or all of the damping terms, for example. Such an embodiment of an inner loop compensator is known as approximate feedback linearization to those skilled in the art. For some embodiments, such as a cartesian robotic manipulator, the dynamics expressed in joint coordinates (3) are identical to those expressed in task coordinates (6), so that the inner loop compensator may be u=v, the identity operator, for these embodiments.

One embodiment includes an outer loop compensator, which makes use of feedback to cause a trajectory of the robotic manipulator x(t) to follow a prescribed reference trajectory r(t). One embodiment is commonly referred to as a Proportional-Integral-Derivative (PID) compensator, $$v = M^{-1}\left( K_i \int_0^t (r - x)d\tau + K_p(r - x) + K_d(\dot{r} - \dot{x}) \right) + w + \ddot{r}, \qquad (10)$$

where r is an n-dimensional reference signal for the robotic manipulator, expressed in the x-coordinates, $\dot{r}$ and $\ddot{r}$ are its derivative and second derivative with respect to time, respectively, $M=\mathrm{diag}\{m_1, m_2, \ldots m_{n_T}, I_1, I_2, \ldots I_{n_R}\}$ is an n-dimensional diagonal reference inertia matrix, $n_T$ is the number of translational degrees of freedom, $n_R$ is the number of rotational degrees of freedom, $n=n_T+n_R$, $K_i$ is an n×n dimensional diagonal matrix of integrator gains $k_{ii}$, for $1 \leq i \leq n$, $K_p$ is an n×n dimensional diagonal matrix of proportional gains $k_{pi}$, for $1 \leq i \leq n$, and $K_d$ is an n×n dimensional diagonal matrix of derivative gains $k_{di}$, for $1 \leq i \leq n$, and w(t) is an n-dimensional impedance shaping signal. Other embodiments may include an outer loop compensator of different types. For example, the integrator, proportional or derivative gains may include off-diagonal terms, integrator reset and anti-windup logic may be included, second integrals with respect to time may be included, and more generally the signals r and x may be filtered in various ways that are well known to those skilled in the art, in order to cause the robotic manipulator trajectory x(t) to track the reference r(t).

In an embodiment, an inner feedback loop and an outer feedback loop are arranged in a cascade, as shown in FIGS. 2 and 3. Substituting (10) into (9), and the result into (8), defining the tracking error vector e=r−x, and simplifying gives the closed-loop dynamics of the robotic manipulator in the x-coordinates:

$$M\ddot{e} + K_d\dot{e} + K_p e + K_i \int_0^t e(\tau)d\tau = -Mw - ML(q, q_e)\hat{F} - \tau_x, \qquad (11)$$

where $L(q,q_e)$ is one embodiment of a tactile sensor alignment matrix, is an n×N matrix whose $k^{th}$ column is $$(DJ^{-1})^{-1} J_k^T n_k,$$

and $\hat{F}=[\hat{f}_1, \hat{f}_2, \ldots, \hat{f}_N]^T$ is an N-vector whose elements are the tactile sensor force measurements $\hat{f}_k$, $1 \leq k \leq N$, and $\tau_x = M(DJ^{-1})^{-1}\tau$.

In some implementations, the tactile sensor alignment matrix $L(q,q_e)$ is a linear operator, represented as a matrix, parameterized by $q$ and $q_e$, from the force measurement vector $\hat{F}$ to the vector input $v$. In principle, if a force is applied to a tactile sensor, resulting in a particular measured value of $\hat{F}$, then the effect of that force can be nulled by defining a value for $w$ to be $-L(q,q_e)\hat{F}$. This value of $w$ is applied through the outer loop compensator (10) and inner loop compensator (9), for constant, steady-state conditions $r=x$, results in a particular value of actuator input $u$ that exactly counteracts the force, resulting in no motion. This would effectively make the steady-state value of robotic manipulator impedance unbounded, or equivalently, make the steady-state robotic manipulator admittance zero, at this particular point on the robotic manipulator. This is an idealization of one embodiment, and clarifies the use of the term tactile sensor alignment matrix for $L(q,q_e)$.

In one embodiment, the impedance shaping signal $w$ is defined by $$w = -K^* L(q, q_e)\hat{F} \tag{12}$$

where $K^*$ is an impedance shaping compensator, which in some embodiments may be a matrix of constant gain, and in other embodiments may be a multivariable linear or nonlinear filter, such as a low-pass or band-pass filter, that takes as input the vector signal $L(q)\hat{F}$ produces as output the input shaping signal $w$. The impedance shaping signal $w$ is fed back and added to the output of an outer loop compensator to define the input $v$ of an inner loop compensator.

A closed-loop system is then represented as $$M\ddot{e} + K_d\dot{e} + K_p e + K_i \int_0^t e(\tau)d\tau = M(K^* - I)L(q, q_e)\hat{F} - \tau_x. \tag{13}$$

The map from input $\hat{F}(t)$ to output $e(t)$ can then be expressed in the frequency domain at a fixed value of manipulator position $\bar{q}$ and a fixed value of end effector position $\bar{q}_e$ and fixed value of reference position $\bar{r}$ as $$(Ms^2 + K_d s + K_p + K_i/s)E(s) = M(K^*(s) - I)L(\bar{q}, \bar{q}_e)\hat{F}(s), \tag{14}$$

where vectors $E(s)$ and $\hat{F}(s)$ are the Laplace transforms of vector signals $e(t)$ and $\hat{F}(t)$, respectively, $K^*(s)$ denotes the Laplace transform of the filter $K^*$, or the Laplace transform of a linearization of the filter $K^*$ if $K^*$ is nonlinear, and $s$ is a complex number. Note that (14) does not include the Laplace transform of the unmeasured force or torque input $\tau_x$. The multivariable admittance (inverse of the impedance) is $$sE(s)\hat{F}^{-1}(s) = (Ms^2 + K_d s + K_p + K_i/s)^{-1} M(K^*(s) - I)L(\bar{q}, \bar{q}_e), \tag{15}$$

which makes clear that $K^*$ can be defined to modify the admittance from measured forces to manipulator velocity, and in particular, can increase or decrease the magnitude of the admittance from measured forces to manipulator velocity, provided $L(\bar{q}, \bar{q}_e)$ is well-defined.

Some embodiments define the impedance shaping signal $w$ as $$w = -K^* \tilde{L}(q, q_e)\hat{F} \tag{16}$$

where the $n \times N$ matrix $\tilde{L}(q,q_e)$ approximates the tactile sensor alignment matrix $L(q,q_e)$. For some embodiments, the computational complexity of $L(q,q_e)$ may be excessive, for example. For these embodiments, the closed-loop system is $$M\ddot{e} + K_d\dot{e} + K_p e + K_i \int_0^t e(\tau)d\tau = M(K^* L(\bar{q}, \tilde{q}_e) - L(\bar{q}, \bar{q}_e))\hat{F} - \tau_x, \tag{17}$$

and map from input $\hat{F}(t)$ to output $e(t)$ can then be expressed in the frequency domain at a fixed value of manipulator position $\bar{q}$ and a fixed value of end effector position $\bar{q}_e$ and a fixed value of reference position $\bar{r}$ as $$(Ms^2 + K_d s + K_p + K_i/s)E(s) = M(K^*(s)\tilde{L}(\bar{q}, \bar{q}_e) - L(\bar{q}, \bar{q}_e))\hat{F}(s), \tag{18}$$

where vectors $E(s)$ and $\hat{F}(s)$ are the Laplace transforms of vector signals $e(t)$ and $\hat{F}(t)$, respectively, $K^*(s)$ denotes the Laplace transform of the filter $K^*$, or the Laplace transform of a linearization of the filter $K^*$ if $K^*$ is nonlinear, and $s$ is a complex number. For these embodiments, the multivariable admittance (inverse of the impedance) is $$sE(s)\hat{F}^{-1}(s) = (Ms^2 + K_d s + K_p + K_i/s)^{-1} M(K^*(s)\tilde{L}(\bar{q}, \bar{q}_e) - L(\bar{q}, \bar{q}_e)), \tag{19}$$

For these embodiments, $K^*$ is defined to modify the admittance from measured forces to manipulator velocity, and in particular, can increase or decrease the magnitude of the admittance from measured forces to manipulator velocity, provided $\tilde{L}$ is sufficiently close to $L$.

EXAMPLE

One implementation of the embodiment of FIG. 10 includes a 3 degree-of-freedom planar robot, with 2 cartesian degrees of freedom $x_1$ 1001 and $x_2$ 1002, and one rotational degree of freedom $x_3$ 1003. Two fixed rails 1004 and 1005 support sliding rail 1006, which in turn supports a sliding and rotating end effector 1007. A tactile sensor 1008 is attached to the end effector 1007, and is of the type that measures both the magnitude and direction of an applied force $f_1$ 1009. A frame is attached at the tactile sensor location $p_1$, with vectors $n_1$ 911 and $n_2$ 1012. The applied force $f_1$ 1009 is resolved into these directions into $\hat{f}_1 n_1$ 1012 and $\hat{f}_2 n_2$ 913, so that $f_1 = \hat{f}_1 n_1 + \hat{f}_2 n_2$. The tactile sensor measurements $\hat{f}_1$ and $\hat{f}_2$ are assumed positive when a force is applied to the tactile sensor. However, this embodiment is not limited to only positive forces being applied to a tactile sensor, which may be able to measure both positive and negative force magnitudes.

A dynamic model for this robot is $$M_1 \ddot{x}_1 = u_1 - \cos(x_3)\hat{f}_1 - \sin(x_3)\hat{f}_2 \qquad (20)$$

$$M_2 \ddot{x}_2 = u_2 - \sin(x_3)\hat{f}_1 - \cos(x_3)\hat{f}_2 \qquad (21)$$

$$I \ddot{x}_3 = u_3 - R\hat{f}_2 \qquad (22)$$

where $x_1$ and $x_2$ are the cartesian location of the end effector on the plane, and $x_3$ is the end effector orientation, $M_1$ is the mass of the end effector 1007 in the $x_1$ direction, $M_2$ is the mass of the end effector 907 and rail 1006 in the $x_2$ direction, R is the width of the end effector 1007, I is the rotational inertia of the end effector 1007, $u_1$ and $u_2$ are input forces and $u_3$ is an input torque.

For this embodiment, $DJ^{-1}=1$, a=0, and B=I, where I is a 3×3 identity matrix, which implies that u=v, so the inner loop compensator is the identity operator, and $$L(x) = \begin{bmatrix} \cos(x_3) & \sin(x_3) \\ \sin(x_3) & \cos(x_3) \\ 0 & R \end{bmatrix}. \qquad (23)$$

The outer loop compensator is defined by (10), with M=diag{$M_1$, $M_2$, I} and $K_p$ and $K_d$ set to positive diagonal matrices, while the integrator term is set to zero so that $K_i$=0.

This embodiment defines the tactile sensor compensator as in (12), $$w_1 = k^* \cdot \left(\cos(x_3)\hat{f}_1 - \sin(x_3)\hat{f}_2\right) \qquad (24)$$

$$w_2 = k^* \cdot \left(\sin(x_3)\hat{f}_1 - \cos(x_3)\hat{f}_2\right) \qquad (25)$$

$$w_1 = k^* \cdot \left(R\hat{f}_2\right) \qquad (26)$$

with k* a constant positive gain, or alternatively, k* can be a low-pass filter with positive low-frequency gain.

Figure 11:
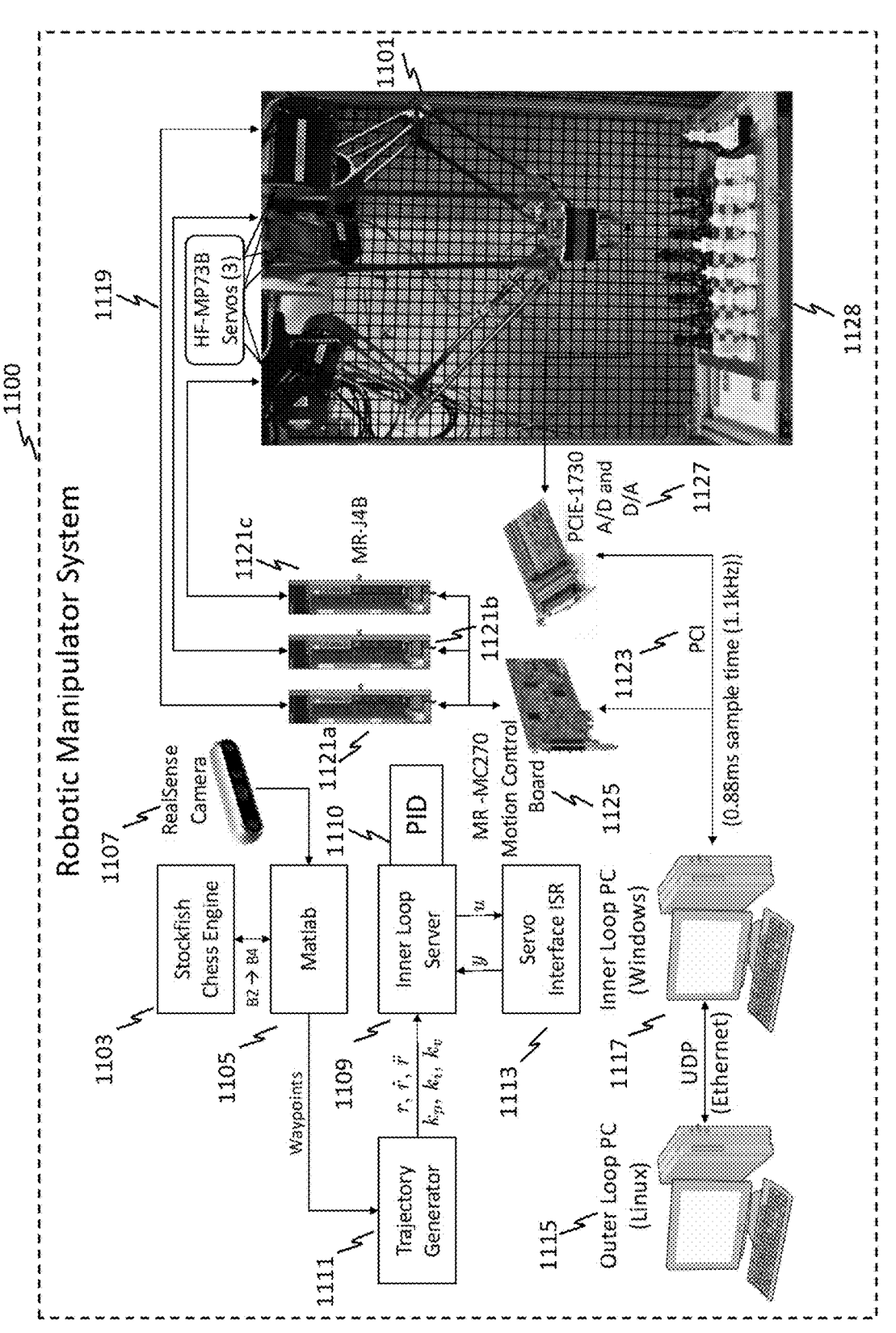
FIG. 11 shows a schematic of an exemplar implementation of the robotic manipulator system of FIG. 1 for playing chess games, according to an example embodiment of the present disclosure.

FIG. 11 illustrates a system 1100 for implementation of the robotic manipulator system of FIG. 1 for playing chess game, according to an example embodiments of the present disclosure. As shown by FIG. 11, the system 1100 includes a delta robot 1101, a chess engine 1103, interfaced to a simulator 1105 (such as MATLAB), a camera 1107, an inner loop server 1109, a trajectory generator 1111, a servo interface 1113, a personal computer (PC) 1115, a PC 1117, including a Peripheral Component Interconnect (PCI) bus 1123, a motion control board 1125, one or more amplifiers, for example, an amplifier 1121*a*, an amplifier 1121*b*, and an amplifier 1121*c*, and one or more servomotors 1119.

In some embodiments, the delta robot 1101 comprises one or more proximal links, one or more distal links, and a parallel gripper. Further, the one or more proximal links may be actuated by the one or more servomotors 1119. Further, the one or more distal links are hollow carbon fiber tubes to reduce weight. Further, the parallel gripper may be mounted an underside of an aluminum wrist flange. The parallel gripper comprises one or more gripper fingers. Further, one or more gripper sensors comprises one or more sensors, for example, tactile sensors attached to the one or more gripper fingers. In some embodiments, the one or more servomotors 1119 are driven by the one or more amplifiers. In some embodiments, the one or more amplifiers may correspond to an MR-J4-B servo amplifier in torque mode. Further, the one or more amplifiers are controlled by the motion control board 1125, for example, a MR-MC210 motion control board.

Further, the motion control board 1125 is installed in the PCI slot of the PC 1117, and interfaces PC 1117 to the servo amplifiers 1121*a*, 1121*b* and 1121*c*. Further, an interface board 1127, including analog-to-digital (A/D) and digital-to-analog (D/A) converters, interfaces the set of gripper sensors to the PC 1117 via a PCI slot 1123. The interface board 1127 may be a PCIE-1730 interface board. Further, the interface board 1127 is configured to generate an analog signal. Further, the analog signal comprises a velocity command. Further, based on the velocity command, the parallel gripper is actuated to perform the one or more operations.

The camera 1107 is configured to monitor a chess board 1128. The camera 1107 is further configured to determine one or more human chess moves, for example, a chess move from a B2 chess square to a B4 chess square. The camera 1107 is further configured to communicate the one or more human chess moves to the simulator 1105, which communicates the one or more human chess moves to the chess engine 1103.

Further, based on the one or more human chess moves, the chess engine 1103 is configured to determine a chess move, and the simulator 1105 is configured to determine a set of waypoints corresponding to the chess move. The simulator 1105 is further configured to transmit the set of waypoints to the trajectory generator 1111, for example, a minimum-time trajectory generator. Further, based on the set of waypoints, the trajectory generator 1111 is configured to determine one or more reference trajectories, for example, r,ṙ,r̈, corresponding a reference position, velocity and acceleration of the gripper, respectively, and feedback gains, for example, $k_p$, $k_i$, $k_v$, corresponding to the one or more delta robot moves for the next turn. Further, the trajectory generator 1111 is configured to transmit the one or more reference trajectories and the feedback gains to the inner loop server 1109. Further, based on the one or more reference trajectories and the feedback gains, the inner loop server 1109 is configured to generate the one or more actuator commands. Further, the inner loop server 1109 is configured to transmit the one or more actuator commands to the servo interface 1113 of the PC 1115.

In some embodiments, one or more chess pieces may be moved to a new location on the chess board. In some embodiments, based on the capture of the one or more chess pieces, the delta robot may remove the one or more chess pieces from the chess board. Further, in some embodiments, the one or more feedback gains may be modified as a function of distance from the chess board 1128 for minimizing the mechanical impedance of the delta robot in the vertical direction, in order to minimize a transfer of energy or momentum between the delta robot and the chess board 1128 which may occur during or after a collision event between a grasped chess piece and the chess board 1128.

The inner loop server 1109 is configured to grasp one or more chess pieces by using the delta robot. Further, the inner loop server 1109 is configured to implement an inner loop compensator which may compensate the effects of gravity and configuration-dependent inertia of the delta robot. Further, the inner loop server 1109 is configured to implement an outer loop compensator which includes a proportional-integral-derivative (PID) type compensator 1110. Further, the inner loop server 1109 is configured to implement a tactile sensor compensator, which takes as input tactile sensor signals via the interface board 1127, subtracts the signals to align the tactile sensor signals to the direction of actuation of the gripper fingers, and filters the result using a constant gain to produce an impedance shaping signal. Further, the inner loop server is configured to add the impedance shaping signal to the output of the inner-loop compensator, to produce an input to the inner loop compensator, and thereby forming a tactile sensor feedback loop. Further, the inner loop compensator is configured to produce an actuation signal which is applied to the servo interface 1113.

The inner loop server 1109 is configured to implement the tactile sensor feedback loop in order to reduce the magnitude of the impedance of the delta robot in the direction of motion of the gripper fingers, at the location of the gripper sensors. This reduces the magnitude of energy or momentum transfer between the delta robot and a chess piece during or after a collision event. A collision event may include grasping a chess piece, or placing a chess piece, for example. As a result, a chess piece may not tip over during or after a collision event.

Servo interface 1113 is configured as an interrupt service routine (ISR) to run on PC 1117, and is triggered by the motion control board 1125 after a determined period of time, for example, for every 0.88 ms to measure servomotor angles or velocities, and to apply one or more actuation signals to the servomotors. Based on a client-server architecture, one or more components may communicate with each other by a UDP protocol. Further, one or more processes run on the PC 1115 or the PC 1117.

FIG. 12 is a flowchart of an example method 1200 according to some embodiments. In some implementations, one or more method blocks of FIG. 12 may be performed by a feedback controller.

As shown in FIG. 12, method 1200 may include receiving measurement signals from one or more tactile sensors, where the measurement signals include measurements of one or more magnitudes of one or more forces along one or more directions relative to the tactile sensor (block 1202). For example, device may receive measurement signals from one or more tactile sensors, where the measurement signals include measurements of one or more magnitudes of one or more forces along one or more directions relative to the tactile sensor, as described above. As also shown in FIG. 12, method 1200 may include filtering the measurement signals to align some or all of the measurement signals to one or more directions of motion of the end effector to produce an impedance shaping signal (block 1204). For example, device may filter the measurement signals to align some or all of the measurement signals to one or more directions of motion of the end effector to produce an impedance shaping signal, as described above.

As further shown in FIG. 12, method 1200 may include determining one or more control signals to the actuators to track a reference state of the end effector based on measurements of the state of the end effector (block 1206). For example, device may determine one or more control signals to the actuators to track a reference state of the end effector based on measurements of the state of the end effector, as described above. As also shown in FIG. 12, method 1200 may include combining the control signal with the impedance shaping signal to produce control commands (block 1208). For example, device may combine the control signal with the impedance shaping signal to produce control commands, as described above.

As further shown in FIG. 12, method 1200 may include submitting the determined control commands to the actuators causing a change in the state of the end effector, where the state of the end effector includes one or a combination of an end effector position, an end effector velocity, and an end effector force (block 1210). For example, device may submit the determined control commands to the actuators causing a change in the state of the end effector, where the state of the end effector includes one or a combination of an end effector position, an end effector velocity, and an end effector force, as described above.

Although FIG. 12 shows example blocks of method 1200, in some implementations, method 1200 may include additional blocks, fewer blocks, different blocks, or differently arranged blocks than those depicted in FIG. 12. Additionally, or alternatively, two or more of the blocks of method 1200 may be performed in parallel.

Method 1200 may include additional implementations, such as any single implementation or any combination of implementations described below and/or in connection with one or more other processes described elsewhere herein. A first implementation, method 1200 further includes modifying a magnitude of an impedance measured at the one or more tactile sensors using a filter.

A second implementation, alone or in combination with the first implementation, method 1200 further includes combining values of the measurement signals into a measurement vector; multiplying the measurement vector with a sensor alignment matrix; and filtering a product of the measurement vector with the sensor alignment matrix using a filter with a non-zero gain.

In a third implementation, alone or in combination with the first and second implementation, the gain is negative.

In a fourth implementation, alone or in combination with one or more of the first through third implementations, the sensor alignment matrix is computed from one or more Jacobians of the robotic manipulator forward kinematics from joint coordinates of locations of the one or more tactile sensors, and where the sensor alignment matrix includes multiple rows and multiple columns defining a dimension of the sensor alignment matrix as a function of degrees of freedom of the end effector.

Although FIG. 12 shows example blocks of method 1200, in some implementations, method 1200 may include additional blocks, fewer blocks, different blocks, or differently arranged blocks than those depicted in FIG. 12. Additionally, or alternatively, two or more of the blocks of method 1200 may be performed in parallel.

Figure 13:
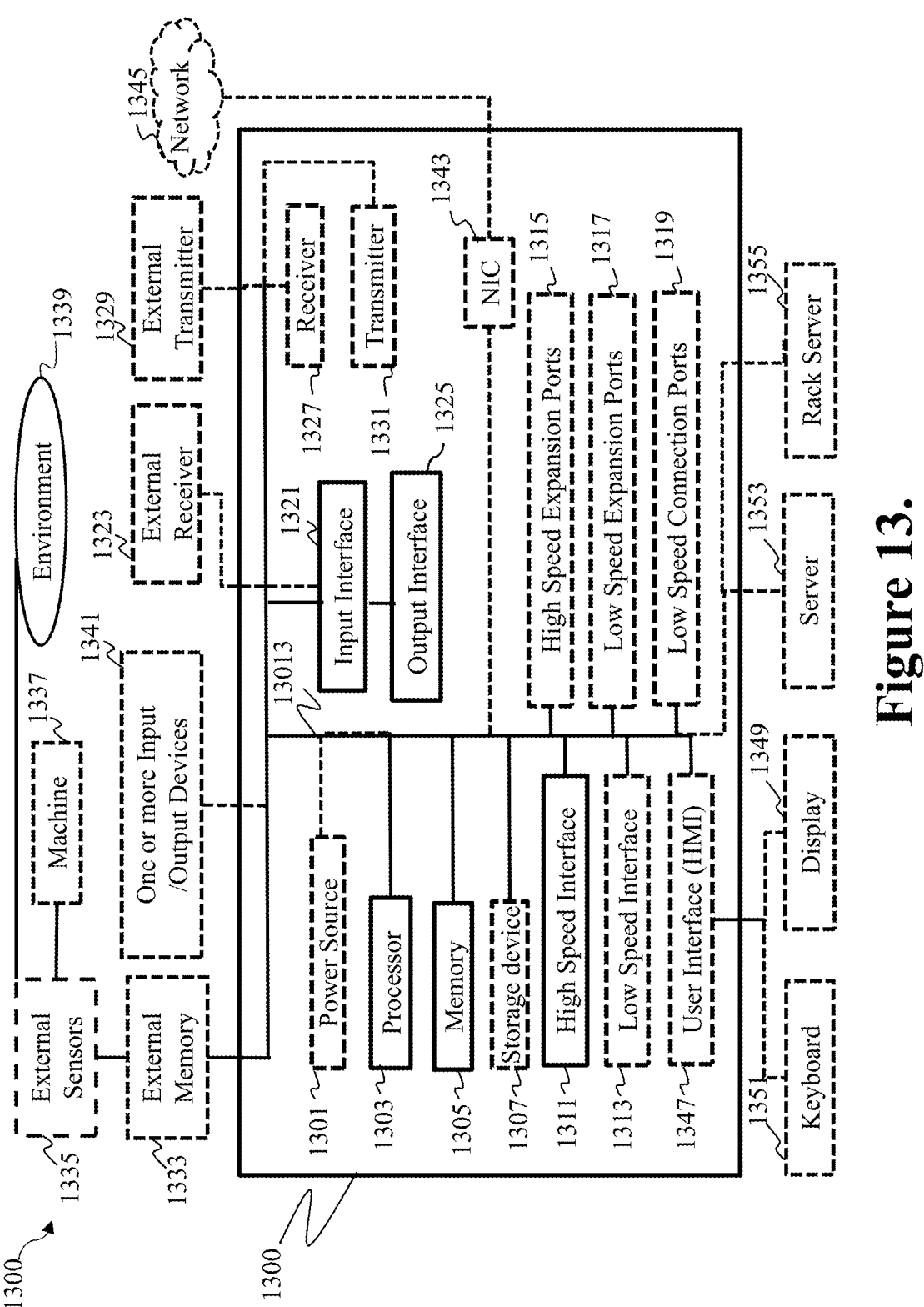
FIG. 13 is a schematic illustrating a computing device for implementing the robotic motion controller and tactile sensor compensator of the present disclosure.

FIG. 13 is a schematic illustrating a computing device 1300 for implementing the the robotic motion controller 107 and tactile sensor compensator 117 of the present disclosure. The computing device 1300 includes a power source 1301, a processor 1303, a memory 1305, a storage device 1307, all connected to a bus 1309. Further, a high-speed interface 1311, a low-speed interface 1313, high-speed expansion ports 1315 and low speed connection ports 1317, can be connected to the bus 1309. In addition, a low-speed expansion port 1319 is in connection with the bus 1309. Further, an input interface 1321 can be connected via the bus 1309 to an external receiver 1323 and an output interface 1325. A receiver 1327 can be connected to an external transmitter 1329 and a transmitter 1331 via the bus 1309. Also connected to the bus 1309 can be an external memory 1333, external sensors 1335, machine(s) 1337, and an environment 1339. Further, one or more external input/output devices 1341 can be connected to the bus 1309. A network interface controller (NIC) 1343 can be adapted to connect through the bus 1309 to a network 1345, wherein data or other data, among other things, can be rendered on a third-party display device, third party imaging device, and/or third-party printing device outside of the computing device 1300.

The memory 1305 can store instructions that are executable by the computing device 1300 and any data that can be utilized by the methods and systems of the present disclosure. The memory 1305 can include random access memory (RAM), read only memory (ROM), flash memory, or any other suitable memory systems. The memory 1305 can be a volatile memory unit or units, and/or a non-volatile memory unit or units. The memory 1305 may also be another form of computer-readable medium, such as a magnetic or optical disk.

The storage device 1307 can be adapted to store supplementary data and/or software modules used by the computer device 1300. The storage device 1307 can include a hard drive, an optical drive, a thumb-drive, an array of drives, or any combinations thereof. Further, the storage device 1307 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1303), perform one or more methods, such as those described above.

The computing device 1300 can be linked through the bus 1309, optionally, to a display interface or user Interface (HMI) 1347 adapted to connect the computing device 1300 to a display device 1349 and a keyboard 1351, wherein the display device 1349 can include a computer monitor, camera, television, projector, or mobile device, among others. In some implementations, the computer device 1300 may include a printer interface to connect to a printing device, wherein the printing device can include a liquid inkjet printer, solid ink printer, large-scale commercial printer, thermal printer, UV printer, or dye-sublimation printer, among others. The high-speed interface 1311 manages bandwidth-intensive operations for the computing device 1300, while the low-speed interface 1313 manages lower bandwidth-intensive operations. Such allocation of functions is an example only. In some implementations, the high-speed interface 1311 can be coupled to the memory 1305, the user interface (HMI) 1349, and to the keyboard 1351 and the display 1349 (e.g., through a graphics processor or accelerator), and to the high-speed expansion ports 1315, which may accept various expansion cards via the bus 1309. In an implementation, the low-speed interface 1313 is coupled to the storage device 1307 and the low-speed expansion ports 1317, via the bus 1309. The low-speed expansion ports 1317, which may include various communication ports (e.g., USB, Bluetooth, Ethernet, wireless Ethernet) may be coupled to the one or more input/output devices 1341. The computing device 1300 may be connected to a server 1353 and a rack server 1355. The computing device 1300 may be implemented in several different forms. For example, the computing device 1300 may be implemented as part of the rack server 1355.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function. Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor (s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them. According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A feedback controller for controlling a robotic manipulator including one or more actuators mechanically connected to joints of the robotic manipulator for moving an end effector based on measurements of one or more tactile sensors attached to the end effector, the feedback controller includes a circuitry forming modules of the feedback controller, the modules comprising:

a tactile sensor compensator configured to (1) receive measurement signals from the one or more tactile sensors, wherein the measurement signals include measurements of one or more magnitudes of one or more forces along one or more directions relative to the one or more tactile sensors and (2) filter the measurement signals to align some or all of the measurement signals to one or more directions of motion of the end effector to produce an impedance shaping signal; and a motion controller configured to (1) determine one or more control signals to the one or more actuators to track a reference state of the end effector based on measurements of the state of the end effector; (2) combine the one or more control signals with the impedance shaping signal to produce control commands and (3) output the determined control commands to the one or more actuators causing a change in the state of the end effector, wherein the state of the end effector includes one or a combination of an end effector position, an end effector velocity, and an end effector force.

2. The feedback controller of claim 1, wherein a filter of the tactile sensor compensator modifies magnitude of an impedance as measured at the one or more tactile sensors.

3. The feedback controller of claim 2, wherein the filter is a matrix of one or more linear gains, low-pass filters, band-pass filters, or a combination thereof.

4. The feedback controller of claim 1, wherein, to produce the impedance shaping signal, the tactile sensor compensator is configured to combine values of the measurement signals into a measurement vector; and multiply the measurement vector with a sensor alignment matrix.

5. The feedback controller of claim 4, wherein the tactile sensor compensator filters a product of the measurement vector with the sensor alignment matrix using a filter with a non-zero gain.

6. The feedback controller of claim 5, wherein the gain is negative.

7. The feedback controller of claim 5, wherein the filter is a matrix of one or more linear gains, low-pass filters, band-pass filters, or a combination thereof.

8. The feedback controller of claim 4, wherein the sensor alignment matrix is computed from one or more Jacobians of the robotic manipulator forward kinematics from joint coordinates of locations of the one or more tactile sensors.

9. The feedback controller of claim 4, wherein the sensor alignment matrix includes multiple rows and multiple columns defining a dimension of the sensor alignment matrix as a function of degrees-of-freedom of the end effector.

10. The feedback controller of claim 1, wherein the motion controller includes an inner loop compensator and an outer loop compensator, wherein the inner loop compensator takes as input the sum or difference between the output of the outer loop compensator and the impedance shaping signal.

11. The feedback controller of claim 10, wherein the inner loop compensator is an identity operator.

12. The feedback controller of claim 10, wherein the inner loop compensator is configured to compensate the control commands for effects of gravity, configuration-dependent inertia, centripetal forces or torques, Coriolis forces or torques.

13. The feedback controller of claim 10, wherein the outer loop compensator includes a proportional-integral-derivative (PID) controller or a proportional-derivative (PD) controller.

14. The robotic manipulator controlled by the feedback controller of claim 1.

15. A robotic manipulator system including a union of robotic manipulators including the robotic manipulator of claim 14.

16. A method for feedback control of a robotic manipulator including one or more actuators mechanically connected to joints of the robotic manipulator for moving an end effector based on measurements of one or more tactile sensors attached to the end effector, wherein the method uses a processor coupled with stored instructions implementing the method, wherein the instructions, when executed by the processor carry out steps of the method, comprising:

receiving measurement signals from one or more tactile sensors, wherein the measurement signals include measurements of one or more magnitudes of one or more forces along one or more directions relative to the one or more tactile sensors;

filtering the measurement signals to align some or all of the measurement signals to one or more directions of motion of the end effector to produce an impedance shaping signal;

determining one or more control signals to the one or more actuators to track a reference state of the end effector based on measurements of the state of the end effector;

combining the one or more control signals with the impedance shaping signal to produce control commands;

submitting the determined control commands to the one or more actuators causing a change in the state of the end effector, wherein the state of the end effector includes one or a combination of an end effector position, an end effector velocity, and an end effector force.

17. The method of claim 16, further comprising:

modifying a magnitude of an impedance measured at the one or more tactile sensors using a filter.

18. The method of claim 16, further comprising:

combining values of the measurement signals into a measurement vector;

multiplying the measurement vector with a sensor alignment matrix; and filtering a product of the measurement vector with the sensor alignment matrix using a filter with a non-zero gain.

19. The method of claim 18, wherein the gain is negative.

20. The method of claim 18, wherein the sensor alignment matrix is computed from one or more Jacobians of the robotic manipulator forward kinematics from joint coordinates of locations of the one or more tactile sensors, and wherein the sensor alignment matrix includes multiple rows and multiple columns defining a dimension of the sensor alignment matrix as a function of degrees of freedom of the end effector.

* * * * *